United States Patent [19]

Ueda et al.

[11] Patent Number: 5,052,669
[45] Date of Patent: Oct. 1, 1991

[54] AUTOMATIC DOCUMENT FEEDER

[75] Inventors: Noriyoshi Ueda, Yokohama; Yuji Takahashi; Makoto Kitahara, both of Tokyo; Masaaki Sato, Yokohama; Naho Wakao, Machida, all of Japan

[73] Assignee: Canon Kabushiki Kaisha, Tokyo, Japan

[21] Appl. No.: 652,224

[22] Filed: Feb. 6, 1991

Related U.S. Application Data

[63] Continuation of Ser. No. 268,627, Nov. 2, 1988, abandoned, which is a continuation of Ser. No. 76,492, Jul. 22, 1987, abandoned.

[30] Foreign Application Priority Data

| Jul. 24, 1986 | [JP] | Japan | 61-174656 |
| Sep. 24, 1986 | [JP] | Japan | 61-225421 |
| Sep. 30, 1986 | [JP] | Japan | 61-231965 |
| Jan. 8, 1987 | [JP] | Japan | 62-2846 |
| Jan. 21, 1987 | [JP] | Japan | 62-12839 |

[51] Int. Cl.$^5$ .............................. B65H 3/06
[52] U.S. Cl. ........................ 271/3.1; 271/9; 271/110; 271/293; 271/294; 271/301; 271/902; 271/119
[58] Field of Search .................. 271/3.1, 9, 902, 301, 271/292–294, 110, 119

[56] References Cited

U.S. PATENT DOCUMENTS

| 3,565,420 | 2/1971 | Howard | 271/163 X |
| 4,076,408 | 2/1978 | Reid et al. | |
| 4,145,037 | 3/1979 | Mol | 271/294 X |
| 4,411,517 | 10/1983 | Gerken | 271/3.1 X |
| 4,508,447 | 4/1985 | Doery | 271/3.1 X |

FOREIGN PATENT DOCUMENTS 60-83024 11/1985 Japan .

OTHER PUBLICATIONS

IBM Techincal Disclosure Bulletin, vol. 18, No. 12, May 1976, M. J. Miller.

Primary Examiner—Richard A. Schacher
Attorney, Agent, or Firm—Fitzpatrick, Cella, Harper & Scinto

[57] ABSTRACT

An automatic document feeder includes original stacker having plural stages spaced from each other, each of which is capable of accommodating sheet originals; a support for supporting the plural stages for movement substantially along the stages; a feeder for feeding sheet originals from a selected one of the stages of the original stacker; conveyer for conveying the sheet originals from the feeder to a predetermined position; reversing device for returning the sheet originals having been placed at the predetermined position to the same selected stage; and a driver for driving the original stacker so as to bring the plural stages selectively toward the feeder.

34 Claims, 18 Drawing Sheets

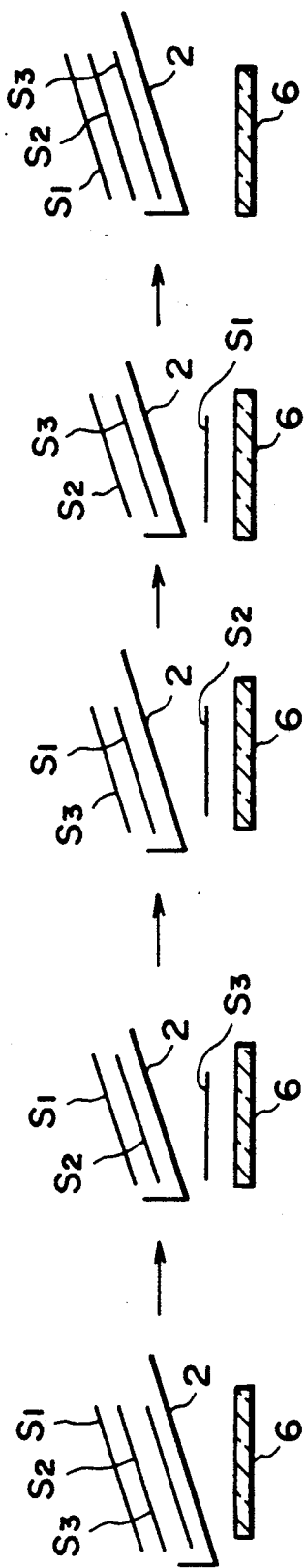
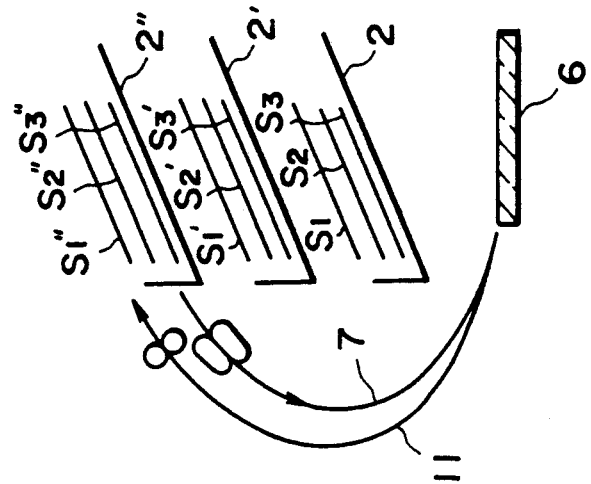
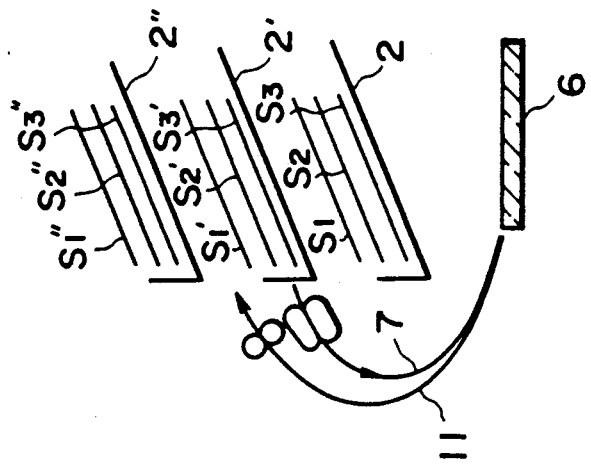
FIG. 6
FIG. 7A  FIG. 7B  FIG. 7C

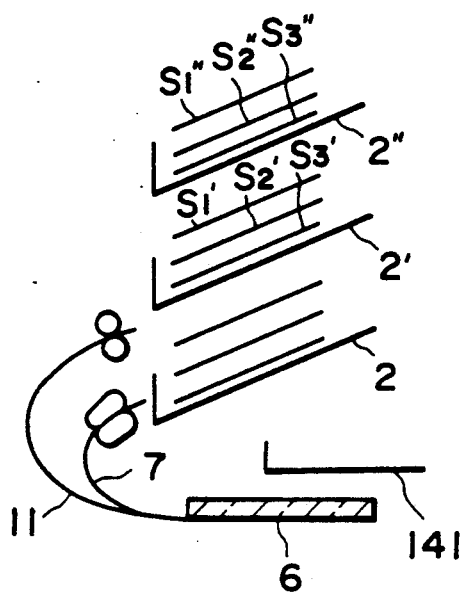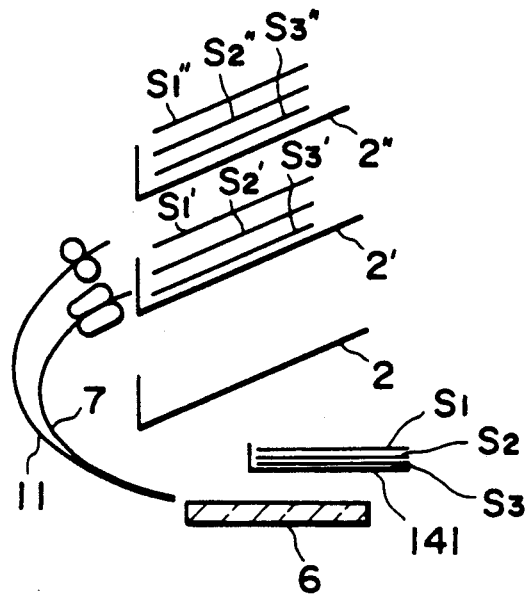
FIG. 18A  FIG. 18B
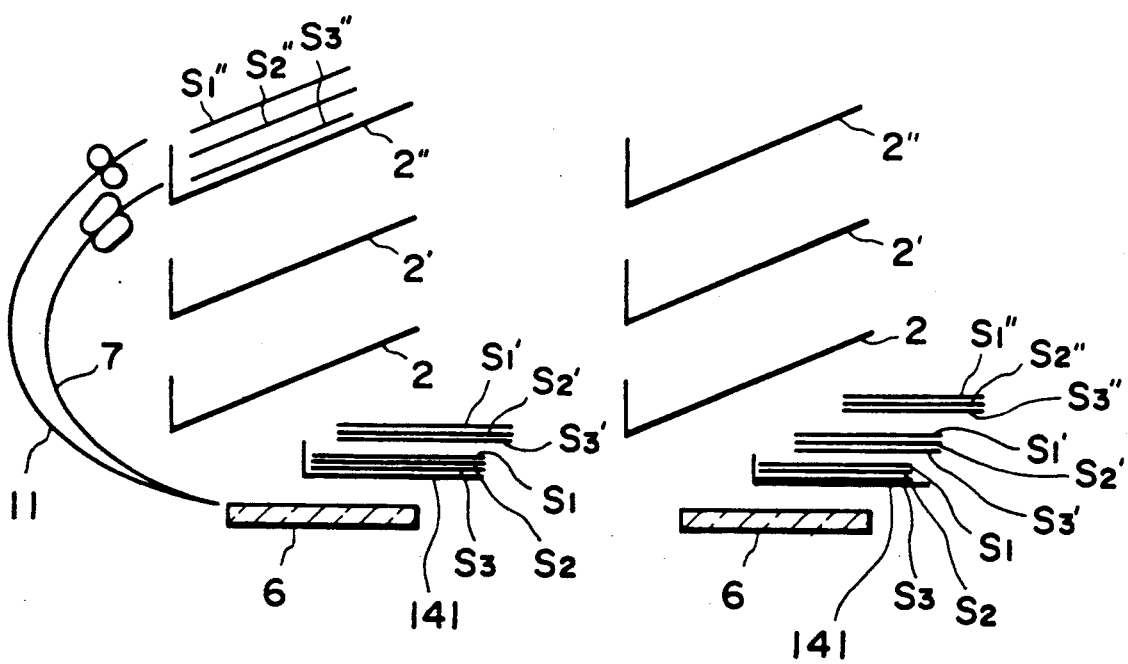
FIG. 18C  FIG. 18D

AUTOMATIC DOCUMENT FEEDER

This application is a continuation of application Ser. No. 268,627, filed Nov. 2, 1988, now abandoned, which is a continuation of application Ser. No. 076,492, filed on July 22, 1987, now abandoned.

FIELD OF THE INVENTION AND RELATED ART

The present invention relates to an automatic document or original feeder usable with an image forming apparatus such as a copying machine, printer and laser beam printer.

Conventional image forming machines such as copying machines are equipped with only one automatic document feeder, and therefore, only one set of documents or originals can be handled at a time when the automatic document feeder is used to set the documents at an original reading station.

If an operator goes to a copying machine and attempts to set his documents, he has to wait for the apparatus to finish processing all the documents being set in the machine, if the copying machine is processing a set of originals. If he does not wait and leaves the copying machine, and thereafter returns to the copying machine to set the originals, the time from the finishing of the previous originals to the start of the next original processing is wasted, so that the image forming apparatus is not efficiently used.

In order to avoid the defects, a proposal has been wherein plural sets of originals are "reserved" for sequential processing, as disclosed in U.S. Pat. No. 4,248,529, Japanese Laid-Open Patent Application Publications No. 121136/1979, 122567/1979, 12937/1980 and 50260/1980 and U.S. Ser. Nos. 903,287 and 28,732. In such an apparatus plural reservation shelves are located outside an automatic original feeding apparatus, and the sets of originals are sequentially fed to the automatic document feeder; and after one set of the originals is finished, it is discharged to an original tray. This, however, makes the apparatus bulky, and in addition, the original transportation path is relatively long so that the original is not processed reliably.

It is conventional that in order to take plural sets of copies from plural pages of originals by a copying machine, a first original is set on a platen glass and a required number of copies of the first page are continuously produced; and this is repeated for all the pages; and then the copies discharged from the copying machine are sorted by operator or a sorting machine to provide a required number of sets of copies in the page order.

However, when plural sets of originals having different copying conditions are copied, each of the bins of the sorter receive copies having different copy conditions. Therefore, the operator has to sort them for each set. This requires complicated manipulation and is not suitable for high speed operation.

In order to solve the problem arising from continuously copying one page of the originals and then sorting them, a recirculation type automatic document feeder is known wherein the originals supplied from an original stacking table are returned to the original stacking table each time it is copied once, so that one complete set of the originals is first produced, and then it is repeated a required number of times, wherein the apparatus is provided with a finisher such as a stapler, which then can staple the copies set by set. In this recirculation type original feeding apparatus, the time required for the handling after the copy can be greatly reduced as compared with the apparatus with the sorter.

However, the recirculation type automatic document feeder contains only one original stacking table, and is capable of processing only one set of originals at a time. Therefore, it is necessary that for processing the next set of originals, the operator has to wait for the completion of the currently performed processing of the originals. Thus the operator is bound for a long period. If the operator leaves the machine rather than waiting, and returns to the machine to process after a period of time, the time from the termination of the processing of the previous set of originals to the start of the processing of the next originals is wasted, thus decreasing rate of operation of the machine, whereby the machine is not efficiently used.

The conventional reservation type recirculation document feeder is substantially free from the above described inconveniences of the necessity of waiting for the currently executed process. However, the conventional apparatus is not provided with any means for identifying the finished or unfinished sets of originals, and therefore, when an operator is going to set his originals on one of the shelves, the operator is not able to determine which shelf is to be used, if, for example, all the shelves are occupied by sets of originals. Therefore, the operator may select wrong shelf.

Additionally, the conventional reservation type document feeder uses external reservation shelves, and the originals are transported from each of the shelves, whereafter the originals are discharged onto a separate discharge table. This makes the size of the apparatus large and makes the original transportation path longer, with the result of unstable original handling or processing.

SUMMARY OF THE INVENTION

Accordingly, it is an object of the present invention to solve one or more of the above described problems.

According to one aspect of the present invention, there is provided an automatic document feeder provided with at least two original stacking table and means for moving the original stacking table to selectively place one of the original stacking tables to a feed/discharge position.

Operators can set the respective sets of originals on the respective original stacking tables. In a predetermined sequence, the original stacking tables now carrying the respective originals are sequentially brought to the original feed/discharge position by the original stacking table moving means. The sheet originals stacked on the first one of the stacking tables are fed to a predetermined position (an original reading station) and are processed (read) and then are discharged back to the original stacking table after the processing. Thus, the sheet originals on the stacking table are sequentially fed, read and discharged back to the stacking table, until all of the originals thereon are processed and discharged back. Then, the next original stacking table is brought to the original feed/discharge position to take the place of the first original stacking table. The sheet originals stacked on the second original stacking table are fed, read and then discharged back to the second original stacking table, similarly to the case of the first original stacking table, until all of the sheet originals on the second original stacking table are processed. Subsequently, the next original stacking table, if any, is brought to the feed/discharge position, and the same operation is repeated for the sheet originals thereon.

According to a second aspect of the present invention, there is provided an automatic document feeder provided with a plurality of original stacking tables which are movable, and an original stacking table driving means for selectively moving the original stacking tables to a predetermined position. By moving the tables the intended table is set so that an original inlet and an original outlet of the document feeder is disposed between the original stacking table carrying the originals to be processed and a back side of another original stacking table adjacent to the original stacking table. Operators can set their sets of originals on the respective original stacking table.

The original stacking tables are moved by said driving means to bring selected one of them in a predetermined sequence. The original stacking table to be brought first is brought to a predetermined position wherein the original inlet for receiving the originals from the stacking table and the original discharging outlet through which the originals are returned to the original stacking table is disposed between the sheet originals stacked on the first stacking table and the backside of the adjacent original stacking table. A first sheet original stacked on the first original stacking table is fed out through the original inlet to a predetermined position (image reading position), is processed (read) and is discharged through an original discharge passage and through the original outlet back to the first original stacking table, where the original is accommodated there, again.

The sheet originals on the original stacking table are sequentially fed to the original reading position, are read and discharged back to the first original stacking table, until all of the originals on the first original stacking tray are processed. Then, in a predetermined sequence, the next original stacking table is brought to the predetermined position and is correctly positioned there to take the place of the first original stacking table. Similar to the case of the first original stacking table, the sheet originals on the second original stacking table are sequentially fed to the original reading position and are accommodated by the second original stacking table again. After all of the originals on the second original stacking table are copied, a next original stacking table is brought to the predetermined position to replace the second original stacking table, thus bringing the original stacking tables to the predetermined position in a predetermined sequence. In this manner, the sheet originals stacked on the respective original stacking table are continuously fed, read and discharged back.

According to a third aspect of the present invention, there is provided a document feeder provided with means for detecting the finish of original processing for an original stacking table and display means for displaying the finishing in response to the detecting means, for each of the original stacking tables.

When the detecting means detects the finish of the sheet original processing for the sheet originals stacked on any one of the original stacking tables, the display means operates to emit light or the like, corresponding to the original stacking table, whereby the termination of the original processing is displayed for the original stacking table.

According to a fourth aspect of the present invention, there is provided an automatic document feeder wherein originals are circulated by feeding a sheet original accommodated in an original stacking table to a predetermined position of the image forming apparatus and by discharging it back to the original stacking table, said original stacking table comprising a plurality of reservation tables which are movable to selectively place one of the reservation tables to the original feed/discharge position by moving means, said feeder including a sheet discharging portion separate from said original stacking table to receive the discharged sheet original, wherein the sheet originals contained in the reservation tables are sequentially processed in a circulating manner, and a sheet original after the circulation is discharged to the original discharging portion.

One of the original reservation tables that contains sheet originals is moved to the feed/discharge position. A first sheet original on the reservation table is fed to a predetermined position of an image forming apparatus, for example, an original reading station where it is processed, for example, read; and is discharged from the predetermined position back to the same original reservation table where the original is collected and accommodated there. The sheet originals on the original reservation table are sequentially fed to the predetermined position of the image forming apparatus and are discharged back to the same original reservation table. The circulation is repeated a predetermined number of times. In the final cycle, after the sheet originals are fed to the predetermined position and are processed there, they are not discharged to the same reservation table but are sequentially discharged to an original discharge portion which is separate from the original stacking table. When all of the originals accommodated in the first reservation table are discharged to the original discharge portion so that it becomes empty, the next original reservation table is brought to the feed/discharge position to replace the first reservation table. Similarly to the above, the sheet originals on the second reservation table are sequentially circulated a predetermined number of times between the predetermined position of the image forming apparatus and the second original reservation table. In the last cycle, the sheet originals on the reservation table are all discharged to and accommodated in the original discharge portion with the result of the second reservation table being empty. In this manner, the original reservation tables are sequentially placed to the feed/discharge position, whereby the sheet originals on the reservation tables are continuously fed to the predetermined position of the image forming apparatus.

According to a fifth aspect of the present invention, there is provided a document feeder including plural original stacking tables which are movable, driving means for selectively bringing one of the original stacking table to an original feeding station, switching means for switching a driving direction of the original feeding station between forward and backward directions, wherein after the sheet originals are circulated a predetermined number of times, the driving of the original feeding station is switched to feed back to the selected original stacking table the sheet originals remaining in the original feeding station. One of the original stacking table that stacks sheet originals is brought to a position corresponding to the original feeding station. The sheet originals stacked on the original stacking table are separated and fed one by one by the original feeding station to a predetermined position of an image forming apparatus, for example, an original reading station and is processed, for example, read, and then is discharged from the predetermined position to the same, that is, the first original stacking table. All the originals on the stacking table are sequentially fed to the predetermined position of the image forming apparatus and then are returned to the same original stacking table, a predetermined number of times. After finishing the predetermined number of circulations, the drive of the original feeding station is switched to feed back to the same original stacking table the sheet originals fed from the original stacking table to the original feeding station and remaining there. Therefore, the sheet originals remaining the original feeding station are returned to the same original stacking table, that is, are discharged from the original feeding station. When all of the sheet originals are discharged from the original feeding station, the next original stacking table is brought to the original feeding station, and the sheet originals stacked on the second original stacking table are circulated between the predetermined position of the image forming apparatus and the original stacking table. For each time of finishing a predetermined number of circulations, the sheet originals remaining in the original feeding station are all discharged, and the subsequent original stacking tables are sequentially placed to the position corresponding to the original feeding station. In this manner, the sheet originals accommodated on the original stacking tables are continuously circulated following the sheet originals accommodated in the previous original stacking table.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 6 are schematic view illustrating processing operations according to the embodiment of the present invention.

FIGS. 7A, 7B and 7C illustrate processing operations for three reservation tables, wherein FIGS. 7A, 7B and 7C illustrate the processing of the first, the second and the third reservation tables, respectively.

FIGS. 18A, 18B, 18C and 18D illustrate processing operations of a set of originals when three reservation tables are used, wherein in FIG. 18A, a first reservation table is aligned with the original feeding inlet; and in FIGS. 18B, 18C and 18D, the set of originals on the first, second and third reservation tables, respectively have been processed.

DESCRIPTION OF THE PREFERRED EMBODIMENTS

Figure 1:
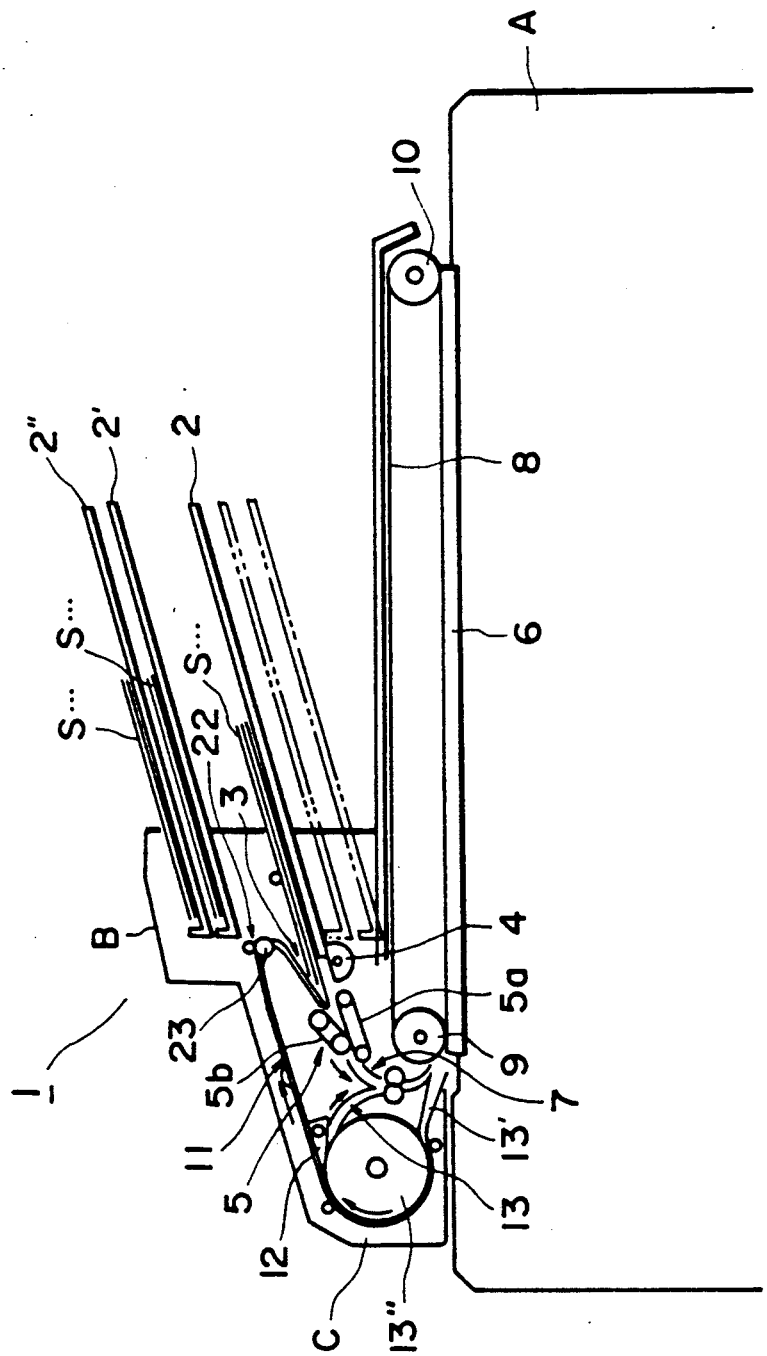
FIG. 1 is a sectional front view of an automatic document feeder according to an embodiment of the present invention.

Referring to FIG. 1, there is shown an automatic document or original feeder according to an embodiment of the present invention, wherein reference A depicts an image forming apparatus such as a copying machine. The document feeder comprises a reservation device B including three, by way of example, i.e., first, second and third reservation tables 2, 2', 2" which are respectively effective to stack a set of documents or originals S. A circulation type automatic document feeding device C is provided with an original inlet 3 for receiving originals and a feeding roller for introducing an original of the set of originals present at the original inlet 3 to an original separating mechanism 5, which includes a conveying belt 5a rotatable in a direction of feeding the sheet out and a separation belt 5b rotatable in the opposite direction, which are cooperable to feed the originals one by one from the bottom of the set of originals S. A sheet passage 7 is provided to guide the original fed out of the separating mechanism 5 onto a platen glass 6. A conveyor belt 8 is trained about a driving roller 9 and a follower roller 10 to cover an entire surface of the platen 6 which constitute a predetermined position. A discharge passage 11 is provided to discharge the original which has been processed, for example, read on the platen 6. An inverse passage 13 serves to invert a duplex original in its facing orientation. A flapper 12 is provided to select the original transportation to the discharge passage 11 or to the inverse passage 13.

The original is discharged by discharging roller 23 through an original outlet 22. A duplex original is fed by way of the passage 7, the belt 8, the platen 6, (the belt reversed), the passage 13', the rollers 13", the passage 13, the belt 8, the platen 6, the belt 8, the passage 13' and the passage 11 in the order named.

Figure 2:
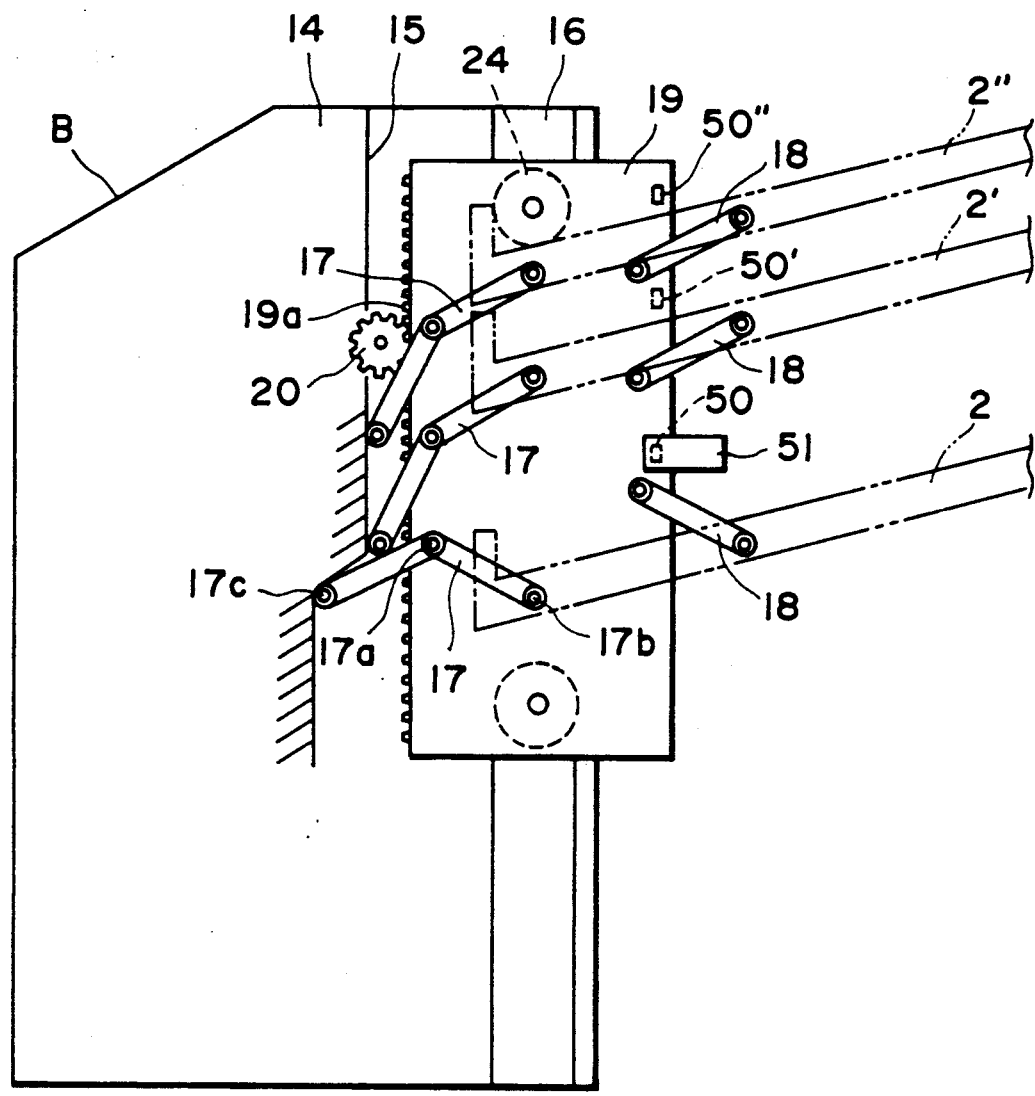
FIG. 2 is a sectional view illustrating a moving mechanism for reservation tables.
Figure 3:
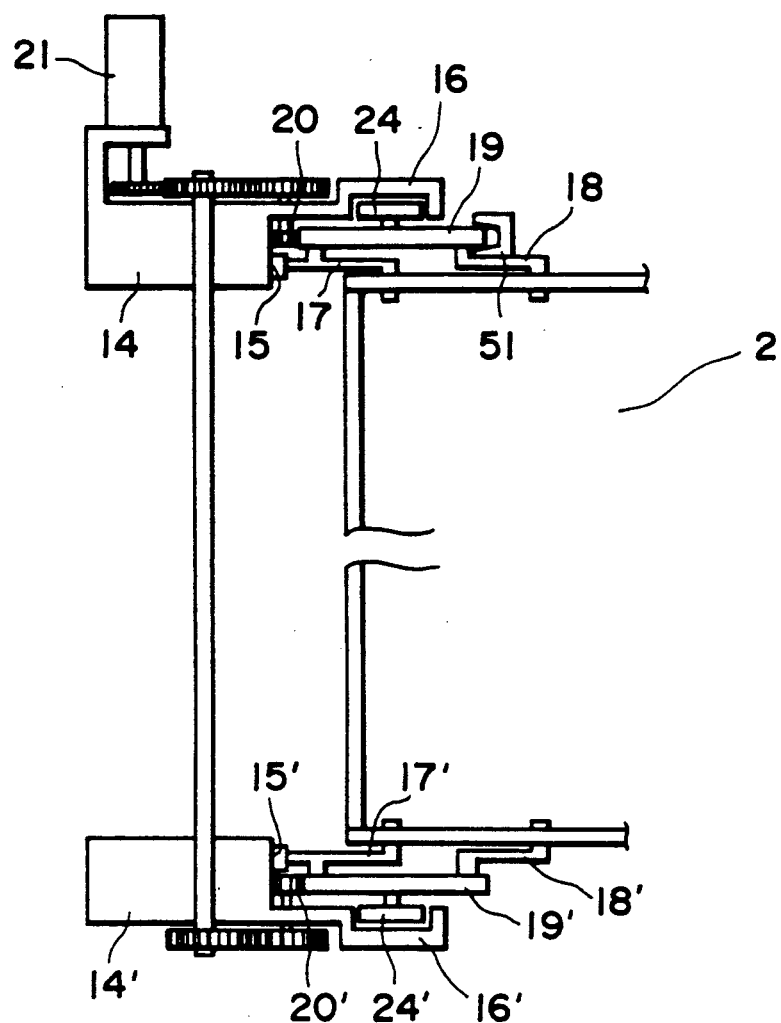
FIG. 3 is a top plan view of the same.

FIGS. 2 and 3 illustrate in greater detail a reservation device B, wherein FIG. 2 is a sectional view, and FIG. 3 is a top plan view.

The reservation device B has front and rear plates 14 and 14' constituting a frame, to which cam plates 15 and 15' and sliding rails 16 and 16' are securely fixed. The reservation tables 2, 2' and 2" are each supported to supporting plates 19 and 19' by a first link 17 and a second link 18 constituting a parallel linkage. The first link 17 in the form of a crank is rotatably supported adjacent its center 17a to the support plate 19, is rotatably mounted to a reservation table 2, 2' or 2" adjacent an end 17b and is engaged to a cam plate 15 adjacent the other end 17c. An end of the support plate 19 is formed into a rack 19a as shown in FIG. 2, which is meshed with a pinion 20 rotatably supported on the plate 14, so that the support plate 19 is elevated or lowered. The pinion 20 is driven by an elevating motor 21.

With the vertical movement of the support plate 19, the intervals between adjacent reservation tables 2, 2' and 2" changes, since the cam plate 15 engaged with the first link 17 has the configuration shown in FIG. 2 so that the link 17 rotates about the pin 17a with the vertical movement. The interval change is such that the interval is expanded at a position corresponding to the original inlet and the original outlet 22. It should be appreciated that the intervals between the adjacent reservation tables 2, 2' and 2" are expanded where it should be expanded, while the interval is reduced where the interval need not be expanded, and therefore, the entire height of the reservation device B is minimized. Guiding roller 24 and 24' are rotatably mounted to the support plate 19 and are engaged with rails 16 and 16' formed in front and rear plates 14 and 14', so as to guide the vertical movement of the supporting plates 19 and 19'. One of the support plates 19 is provided with position detecting hole 50, 50' and 50" at positions corresponding to the reservation tables 2, 2' and 2", which are detected by a position sensor 51, and therefore, it is possible to randomly select one of the reservation tables to be brought to the position corresponding to the original inlet 3 and the original outlet 22 of the circulation type automatic document feeder C.

Figure 4:
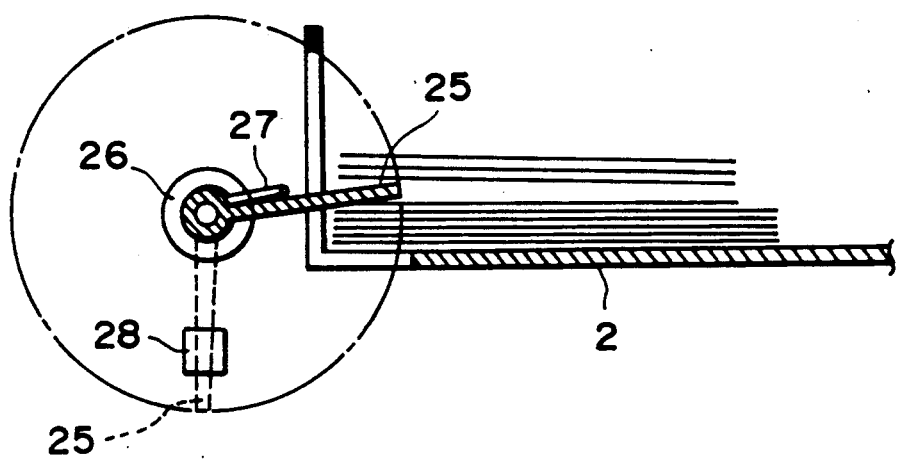
FIG. 4 is a sectional view illustrating a partition lever of a reservation table.

Referring to FIG. 4, the description will be made with respect to a partition means for discriminating a set of originals to enable correct circulation or circulations of the sheet originals.

FIG. 4 is a sectional view illustrating in detail a partition lever for partitioning the first and last pages of the set of the originals S.

A partition lever 25 is rotatable about an output shaft of a motor 26. To the output shaft of the motor 26 a rotary lever 27 is fixed, which functions to lift the partition lever 25 to the topmost of the set of originals S after the partition lever 25 falls by its own weight when the original below the partition lever 25 becomes empty, which is detected by a lever sensor 28 as an indication of the finish of one circulation.

Referring to FIGS. 5A–5D, the reservation tables and a recycle stopper will be described.

Figure 5A:
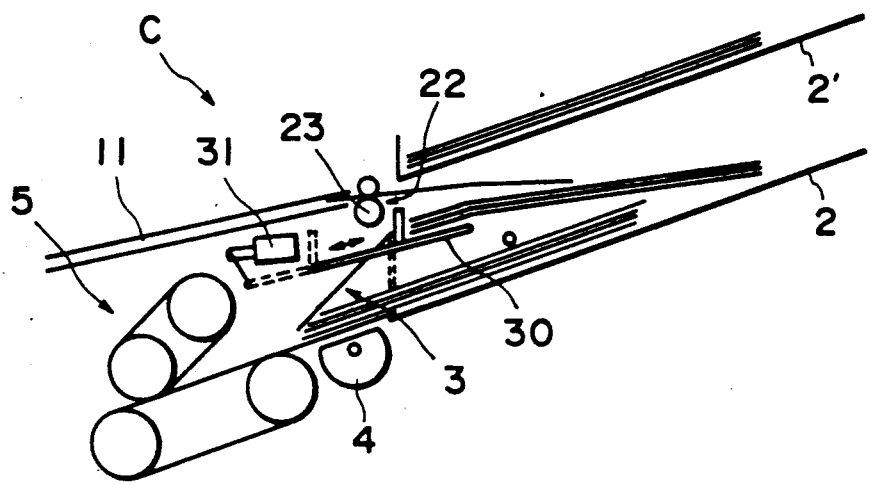
FIG. 5A is a sectional view of reservation tables.

In FIG. 5A, the final cycle is being executed among the circulations of the set of originals S. A recycle stopper 30 is disposed above the original feed inlet 3 of the circulation type automatic document feeder C. It is projected into a position between the original inlet 3 and the original outlet 22 above the reservation table by means of a stopper solenoid 31 and an unshown link mechanism in the document feeder C. When this takes place, all of the subsequently discharged originals are received and stacked on the recycle stopper 30, where the left edges thereof are limited by a riser 30a so that they are prevented from being fed into the original inlet 3 again.

Figure 5B:
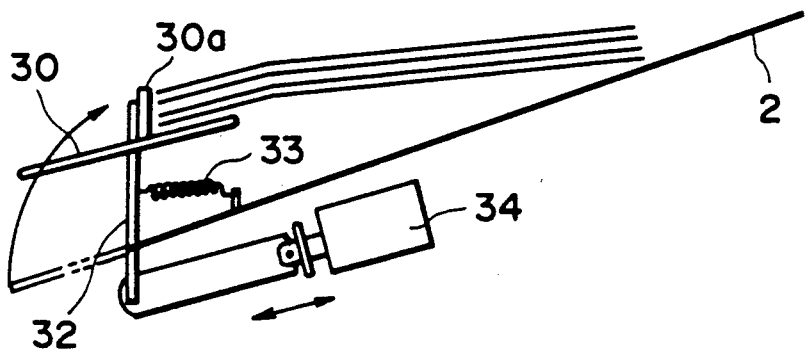
FIG. 5B is a sectional view of a reservation table illustrating operation of an original holder.

Referring to FIG. 5B, an original holder 32 is provided for each of the reservation tables 2, 2' and 2". By way of example, as shown in this Figure, the original holder 32 is rotatable about an axis adjacent an end of the reservation table. The original holder 32 is normally standing by a holder spring 33. When, however, a holder solenoid 34 is energized in the reservation table 2, it becomes to take the position indicated by broken lines so as to provide an extension of the reservation table 2. Then, the set of originals contained in the reservation table 2 falls by its own weight and slides down on the surface of the reservation table 2 due to the inclination of the reservation table 2 to the original inlet 3 of the document feeder C. When the holder solenoid 34 is deenergized, the original holder 32 takes back the standing position, and therefore, the set of originals are not sliden on the surface of the reservation table 2 and is maintained on the table.

Figure 5C:
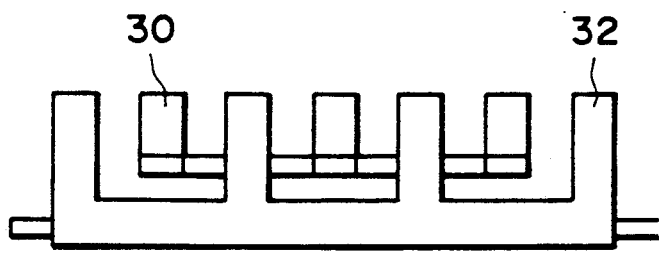
FIG. 5C is a front view illustrating a recycle stopper and the original holder.
Figure 5D:
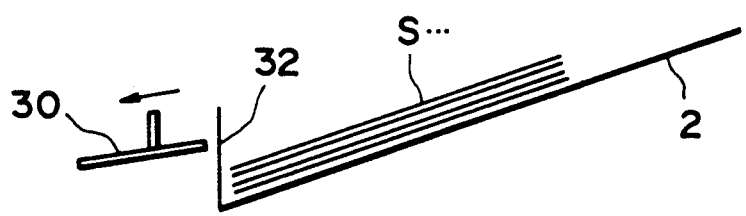
FIG. 5D is a sectional view illustrating a retracted recycle stopper.

FIG. 5C is a side view showing the recycle stopper 30 and the original holder 32. As will be understood from this Figure, they are respectively in the form of comb, which are interlaced so as to prevent the set of originals from unintentionally leaking therebetween. Therefore, after the originals are received on the recycle stopper 30 after completion of the final cycle, the set of originals S is retained on the reservation table 2 by standing the original holder 32 and then retracting the recycle stopper 30, as will be understood from FIG. 5D. Therefore, upon vertical movement of the reservation table, the leading edge portions of the originals do not interfere with any members of the feeding station.

In operation, the operator sets a set of originals S to be image-processed into one of the reservation tables 2, 2' and 2". Desired conditions or modes (number of prints, magnification, image density or the like) are selected on an unshown operation panel in an image forming apparatus A, and then a start key is actuated. The reservation device B starts to operate, and the elevating motor 23 displaces the support plate 19 so as to place the reservation table carrying the set of originals S to a position corresponding to the original inlet 3 of the document feeder C, thus setting the proper reservation table. After this, the holder solenoid 34 is actuated to permit the original holder 32 to fall down, thus allowing the set of originals S slides down by its own weight into the original inlet 3. The thus fed originals S are picked up from the bottom by the separating mechanism 5. The separated original is conveyed through the sheet passage 7 and is set on the platen 6. Then, the original is processed, for example, is subjected to an image exposure operation, whereafter the original is conveyed back through the discharge passage 11 and through the original discharge outlet 22 to the topmost of the stacked originals on the reservation table.

Referring to FIG. 6, a flow of originals S1, S2 and S3 which are simplex originals will be described. The sheet originals are sequentially fed out from the bottom and are collected back. By one execution of a series of operations shown in FIG. 6, one set of originals is processed, and by repeating the series of operations a desired number of times, a desired number of processings can be executed.

FIGS. 7A, 7B and 7C illustrate operations of the reservation tables 2, 2' and 2" when three operators process three simplex originals, respectively. The operators set their originals into the different three reservation tables 2, 2' and 2". The image processing is executed in the order of input. The first operator puts the set of originals S1, S2 and S3 onto the first reservation table 2. The second operator puts the set of originals S'1, S'2 and S'3 onto the second reservation table 2', and the third operator puts the set of originals S"1, S"2 and S"3 onto the third reservation table 2". Assuming that the mode is inputted so as to deal with the reservation tables in the named order, the first reservation table 2 is moved to a position corresponding to the original inlet 3 (FIG. 7A), and the operations such as described with respect to FIG. 6 are prosecuted. At an end, the initial state is restored. Subsequently, the second reservation table 2' is moved to the position corresponding to the original inlet 3 (FIG. 7B), and the same processing operation is executed until the initial state is restored. Further, the third reservation table 2" is brought to the original inlet 3 (FIG. 7C), the processing operation is executed until the initial condition is restored. In this manner, sets of the originals of the three operators are continuously effected without stopping the operation of the image forming apparatus A. If the finished set of the originals are removed from the reservation table, a fourth operator can set his set of originals. Therefore, if the finished set is replaced with unfinished set, the continuous processing can be effected endlessly.

On a part of an outer casing of the reservation table or the reservation device, a display is provided so as to display by LED (light emitting diode), liquid crystal or the like whether the sets of the originals on the reservation tables have been processed or not yet. The next operator can easily discriminate which reservation table is available to him.

The reservation device B is mounted to the circulation type automatic document feeder C, but it is easily detachable therefrom. If the reservation device B is demounted from the document feeder C, a single original or document stacking table can be attached thereto in place of the reservation device B, whereby the document feeder is operated as a usual circulation type document feeder C.

The document feeder C is hinged to the image forming apparatus so as to be openable from the platen glass 6 in the original processing station A. In this case, the reservation device B moves together with the document feeder C away from the platen glass 6. This makes is easier to take a copy of a book original.

In place of the lever sensor, the number of recycles may be detected with the use of a sensor card, which is conveyed by the document feeder as if it is one of the originals and which is detected by a sensor.

Further, in place of a pinion and rack, a helical cam means can be used to elevate and lower the reservation table by its rotation, as shown in Japanese Laid-Open Patent Application No. 183566/1983, for example.

As described in the foregoing, according to this embodiment, the original stacking tables accommodating respective sets of originals are sequentially brought to the feed/discharge position, and the originals accommodated in the original stacking tables are continuously fed out and are collected, whereby the image forming apparatus can be operated continuously without interruption, thus saving time.

Additionally, the sheet originals are collected back to the same original stacking table as the one from which the sheet originals have been fed out, so that the originals are not mixed with other originals set on another original stacking table. Furthermore, since the original stacking table on which the originals are set is the same as the original stacking table collecting the originals, it is easy for the operator to identify his originals, thus facilitating manipulation. Since the original stacking tables are brought to the original feed/discharge position, no additional space is required for placing separate reservation tables externally, so that the size and weight of the entire system can be reduced. For the same reason, the length of the sheet original conveying path is reduced with the result of less possibility of jam, thus increasing the reliability of the system.

Figure 8:
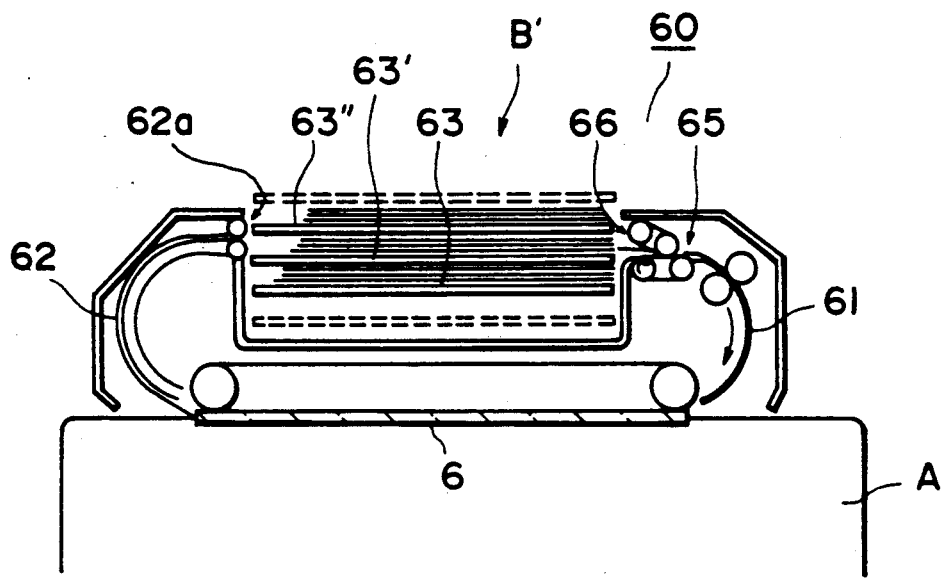
FIG. 8 is a sectional front view of an automatic document feeder according to a second embodiment of the present invention.

Referring to FIG. 8, another embodiment of the present invention will be described. In this embodiment, an automatic document feeder 60, as shown in FIG. 8, is disposed above an image forming apparatus A such as a copying machine, similarly to the case of the automatic document feeder 1 of the foregoing embodiments. The document feeder 60 is provided at one side thereof with a sheet feeding passage 61, and at the opposite side with a sheet discharge passage 62. In a center of the apparatus and between the feed and discharge passages, a reservation device B' is disposed which is equipped with vertically movably first, second and third original stacking tables 63, 63' and 63". When one of the original stacking tables 63, 63' and 63" is selected, for example when the second original stacking table 63" is selected, the unit constituted by the original stacking tables 63, 63' and 63" is shifted so that the original feeding inlet 66 and the discharge outlet 62a of the discharge passage 62 are positioned to between the top surface of the topmost of the original stacked on the second original stacking table 63' and a bottom surface of the third original stacking table 63" which is disposed just above the second original stacking table 62'. The original stacked on the second original stacking table 63' is fed out through the original feed inlet 66 of an original separating mechanism 65 disposed adjacent an end of the sheet passage 61, one by one from the bottom. The sheet fed out is conveyed through the sheet passage 61 and is placed on the platen glass 6 of the copying apparatus A. After the original is subjected to the process, it is moved through the sheet passage 62 and is discharged through the discharge outlet 62a to the second original stacking table 63' in the same direction as when it is fed out.

Thus, the originals stacked on the selected second original stacking table 63' are collected back to the same original stacking table 63'.

Figure 9:
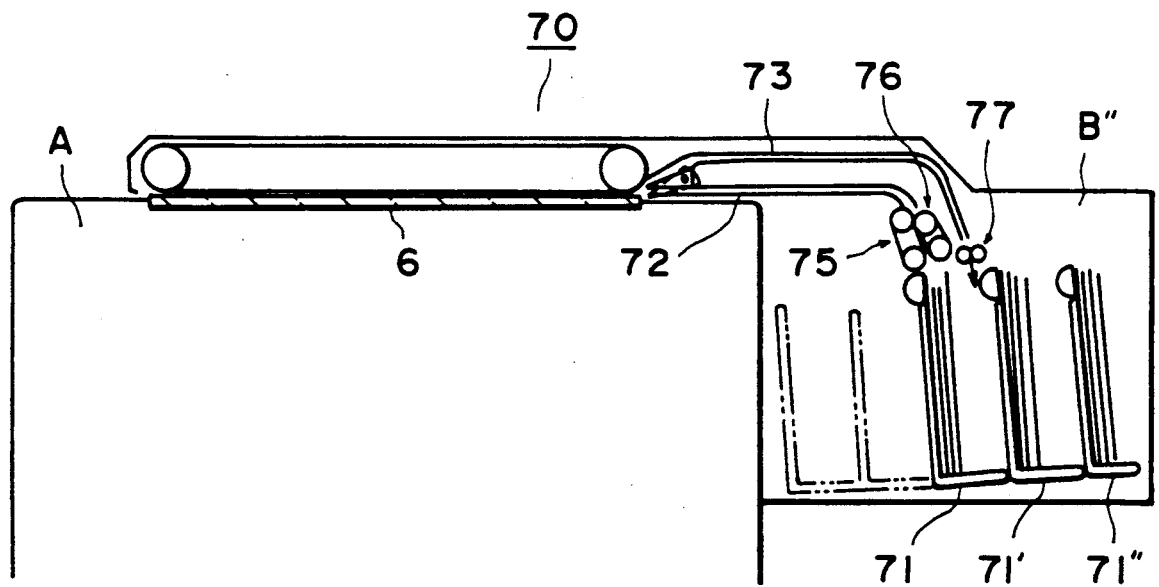
FIG. 9 is a sectional front view of an automatic document feeder according to a third embodiment of the present invention.

Referring to FIG. 9, a third embodiment will be described. The automatic document feeder 70 of this embodiment is equipped with a reservation device B" which is provided at a side of the copying apparatus A with horizontally movable first, second and third original stacking tables 71, 71' and 71". The document feeder 70 has parallel sheet feeding passage 72 and sheet discharging passage 73. By way of example, when the first original stacking table 71 is selected, the original stacking tables 71, 71' and 71" are shifted as a whole, so that the portion between the first original stacking table 71 and the bottom or back surface of the second original stacking table 71' which is adjacent to the first original stacking table 71, is opposed to an original feeding inlet 76 of a sheet separating mechanism 75 disposed adjacent an end of the sheet feed passage 72 and to an original discharge outlet 77 disposed adjacent the discharge passage 73. The originals accommodated in the first original stacking table 71 are conveyed through the original feed inlet 76 and the sheet passage 72 onto the platen 6 of the copying apparatus A. After being subjected to the process, the original is conveyed through the discharge passage 73 and the discharge outlet 77 to the same, that is, the first original stacking table 71. As will be understood, the original stacking tables may be disposed side by side with the copying apparatus without loosing the advantage of collecting the sheets back to the same original stacking table and with ensured circulation.

As described, according to this embodiment of the present invention, plural original stacking tables are movable by table moving means so as to bring a selected one of the original stacking tables to a predetermined position; the original stacking tables are moved to and positioned at the predetermined position in a predetermined sequence; the sheet originals carried on the original stacking tables are continuously fed out and are collected back, whereby the image forming apparatus can be kept operating without interruption, thus saving time and utilizing the apparatus efficiently.

When one of the original stacking tables is shifted to the predetermined position, the original feed inlet and the original discharge outlet are opposed to between the one of the original stacking table and the back side of the adjacent original stacking table, and the originals from the first original stacking table are collected to the same original stacking table with certainty. Therefore, the sheet originals are not mixed with other originals carried on another original stacking table. Since the supplying table is the same as the correcting table, the operator can identify his set of originals without difficulty, thus facilitating manipulation.

Figure 10:
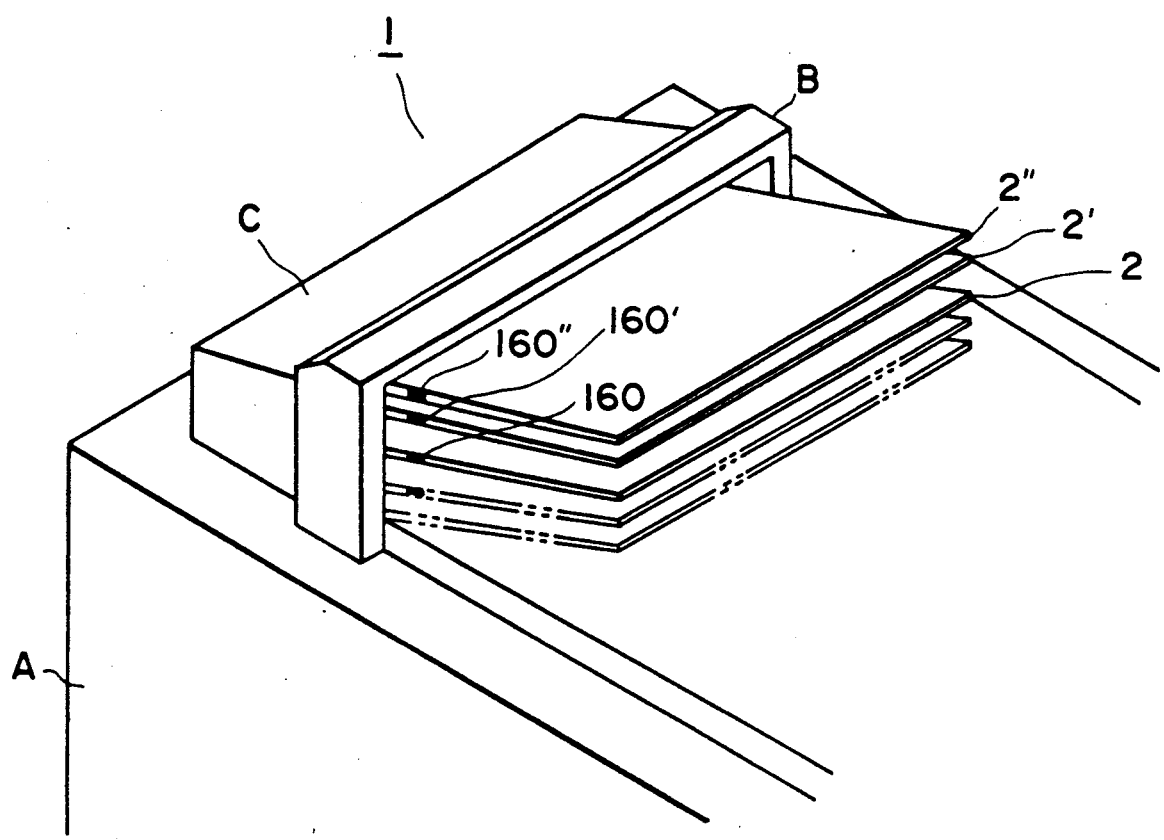
FIG. 10 is a perspective view of a reservation device for an automatic document feeder provided with a display, according to another embodiment of the present invention.

Referring to FIG. 10, a further embodiment will be described. The detailed explanation is omitted for the sake of simplicity by assigning like reference numerals to the elements having corresponding function.

The reservation tables 2, 2' and 2" of the reservation device D are provided with displays 160, 160' and 160" constituting display means. The displays with an LED 161 and with an outer cover 162 of a plastic material, so that the light emanated from the LED can be observed externally.

Figure 11:
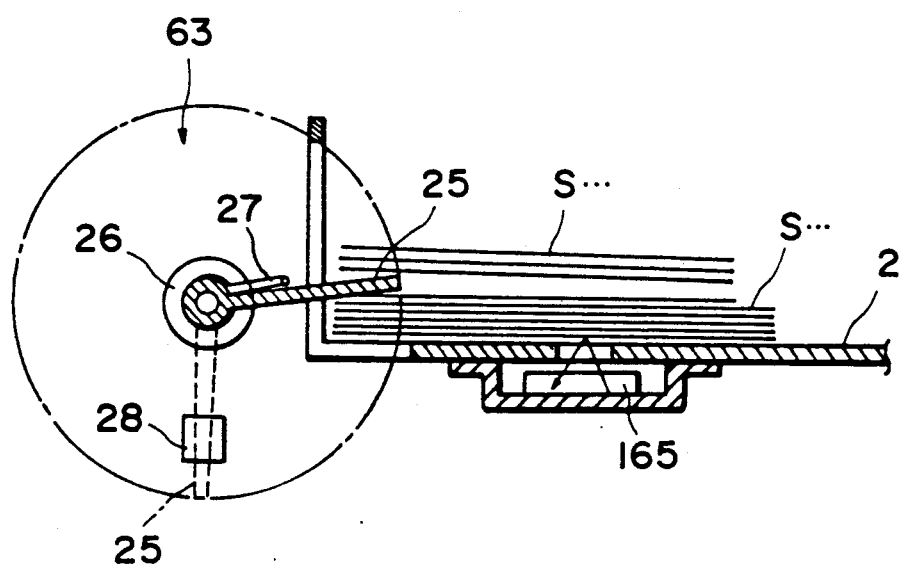
FIG. 11 is a sectional view illustrating a partition means with a lever sensor.
Figure 12:
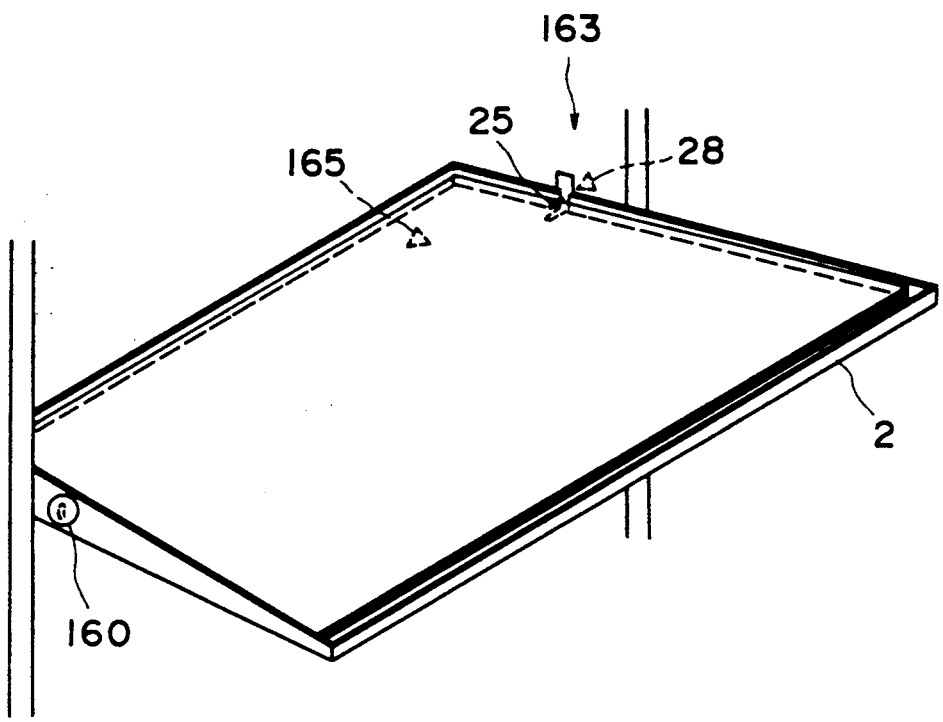
FIG. 12 is a perspective view illustrating the display and lever sensor in a reservation table.
Figure 13A:
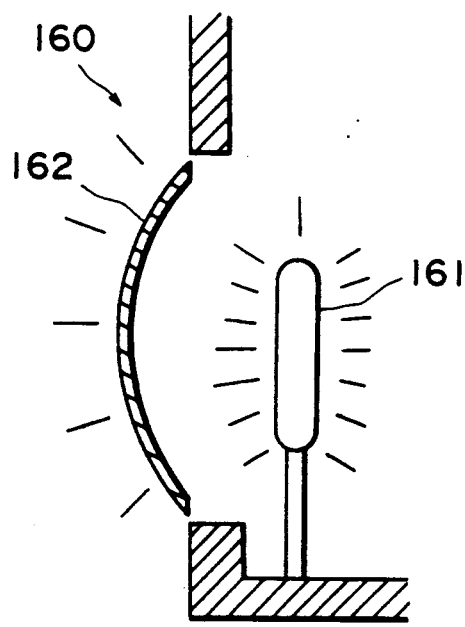
FIG. 13A is a sectional view of a display.
Figure 13B:
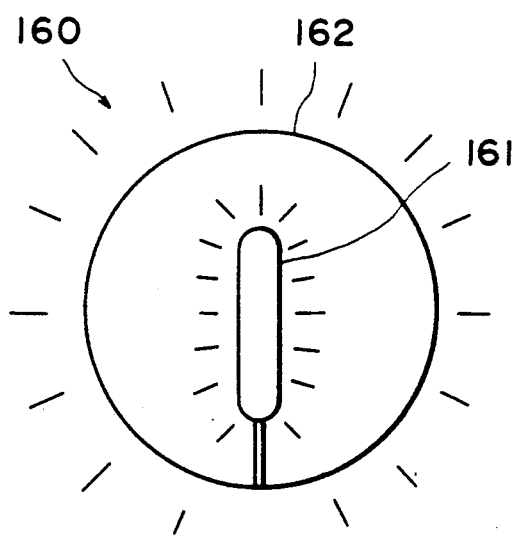
FIG. 13B is a front view of the same.

As shown in FIG. 11 and 12, when a predetermined number of falling actions of the partition lever 25 by the lever sensor 28 are made, a signal is transmitted to the display 160 associated with the lever sensor 28, whereupon the LED 161 in the display 160 is turned on, thus indicating completion of the original processing for the reservation table 2. Each of the reservation tables 2, 2' and 2" has a sensor 165 for detecting absence or presence of the original. If the originals are taken out from the table corresponding to the turned-on LED, the sensor 165 detects the absence of the originals and deactuate the display 160. The display 160, 160' and 160" are actuatable only when the lever sensor 28 detects the predetermined number of the partition lever 25 falling actions, and therefore, they are not actuated even if the originals are set.

In operation, the first reservation table is brought to a position corresponding to the original inlet 3, and the same processing as with FIG. 6 is performed, and thereafter the initial state is restored. Then, the display 160 associated with the first reservation table 2 is actuated to indicate completion of the processing. Subsequently, the second reservation table 2' is shifted to the position corresponding to the original feed inlet 3 (FIG. 7B), and the processing operations are performed, as shown in FIG. 6. After completion, the device and the originals are restored to the initial conditions. Then, the third reservation table 2" is shifted to the position corresponding to the original feed inlet 3 (FIG. 7C), and the initial state is restored after processing. Then, the displays 160' and 160" corresponding to the second and third reservation tables 2' and 2" are actuated to indicate the completion of the processings. In this manner, the sets of originals of three operators are continuously processed without interrupting the image forming apparatus A. If the next operator takes the processed originals out of any one of the reservation tables 2, 2' and 2" that correspond to the display 160, 160' or 160" that is lit on, and a new set of originals is put on the empty reservation table, and this is repeated, the image processing operation can be continued endlessly without malfunction.

The display 160, 160' or 160" is turned off when the originals are taken out of the associated reservation table 2, 2' or 2".

Figure 14:
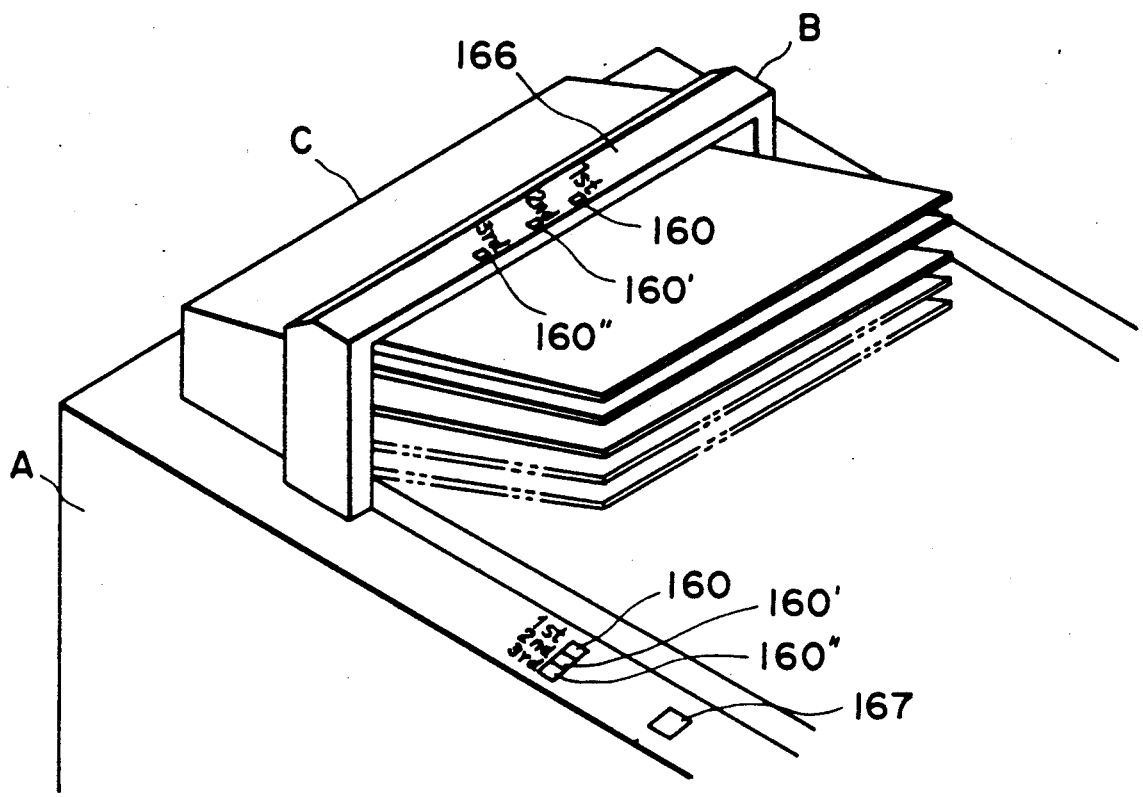
FIG. 14 is a perspective view of a reservation device wherein the display is modified.
Figure 15:
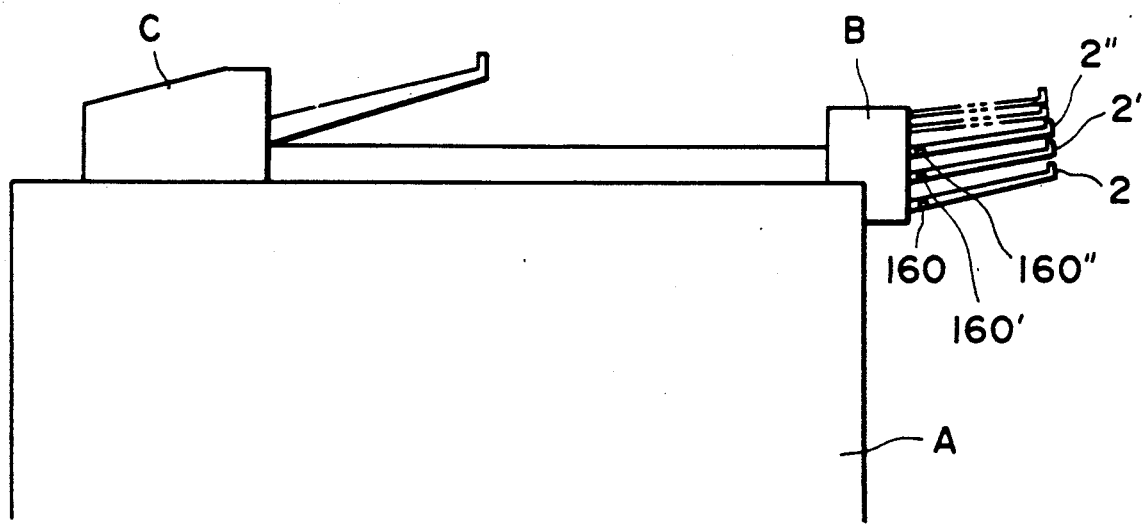
FIG. 15 is a front view of an automatic document feeder used with an external reservation device with a display.

In the foregoing embodiments, the displays 160, 160' and 160" are provided for the respective reservation tables 2, 2' and 2". As an alternative, however, the set of displays may be disposed on the top cover surface, as shown in FIG. 14. As a further alternative, it may be disposed in the neighborhood of the copy button 167 of the image forming apparatus A. As a yet further alternative, as shown in FIG. 15, the displays 160, 160' and 160" may be disposed in the reservation tables 2, 2' and 2" of the reservation device B which is provided externally from the circulation type automatic document feeder C.

The display may be of a liquid crystal type in place of the LED type. If so, the completion of the original processing can be indicated by characters more clearly.

Figure 16:
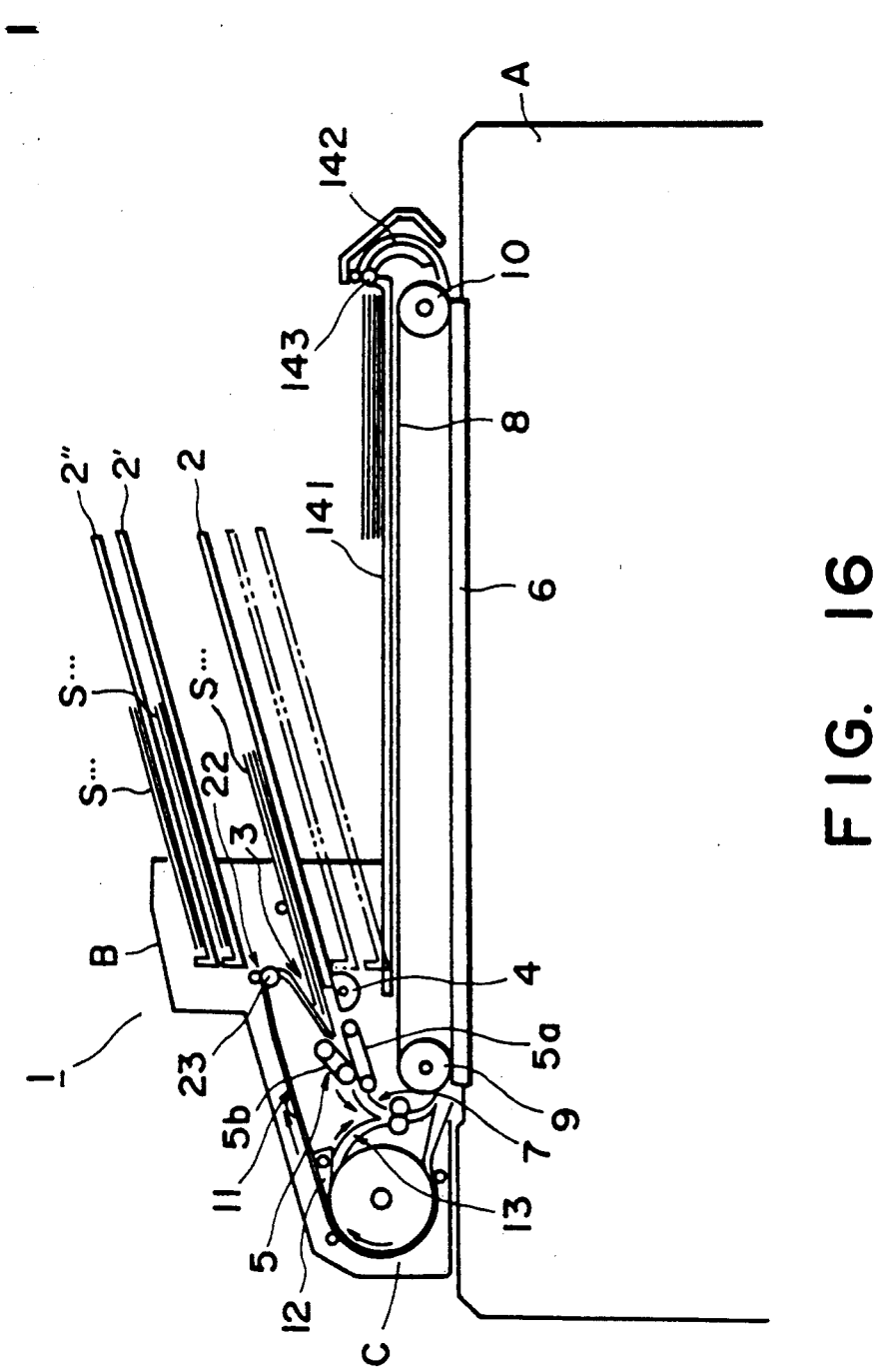
FIG. 16 is a sectional front view of an automatic document feeder according to a further embodiment of the present invention.

As described, according to this embodiment, the document feeder comprises detecting means for detecting completion of the original processing for each of the original stacking tables and display means for displaying the completion for each of the original stacking tables, in response to the detection of the detecting means. Therefore, when the sheet originals stacked on any one of the original stacking tables have been processed, the completion of the processing is displayed for the original stacking table, so that the operator is substantially notified which original stacking table is ready for receiving the next set of originals, thus facilitating manipulation. Referring to FIG. 16, a further embodiment will be described. In this embodiment, above a conveyor belt 8, an original discharging table 141 constituting an original discharging station is disposed. Adjacent a follower roller 10, a guiding passage 142 to the discharge table 141 is formed. The original which has been placed and image-processed on the platen 6 can be, upon selection, discharged through the guiding passage 142 to the original discharging table 141 by discharging roller 143.

Figure 17A:
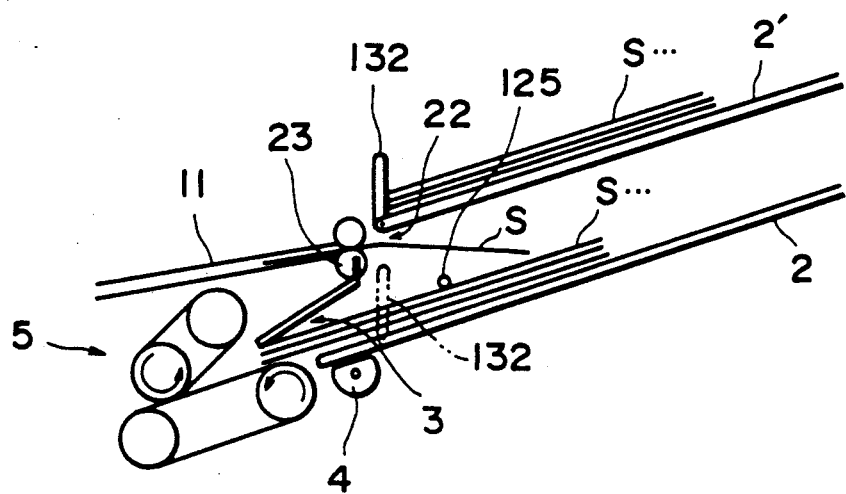
FIG. 17A is an enlarged sectional view of reservation tables disposed adjacent an original feeding inlet.
Figure 17B:
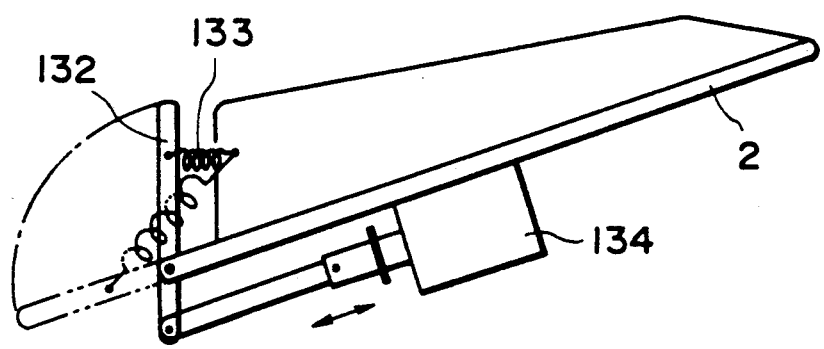
FIG. 17B illustrates an original holder in a reservation table in the device of FIG. 17.

FIG. 17A illustrates in an enlarged view the structure in the neighborhood of the original feed inlet 3 and the original outlet 22 of the circulation type automatic document feeder C, and FIG. 17B shows in detail the reservation table. Each of the reservation tables 2, 2' and 2" is provided with an original holder 132. As best seen in FIG. 17B, the original holder 132 is rotatably mounted to a neighborhood of an end of the reservation table 2. The original holder 132 normally takes the upright position by means of a holder spring 133. When, however, a holder solenoid 34 in the reservation table 2 is energized, it takes the broken line position to provide an extension of the reservation table 2. Therefore, when the holder solenoid 134 is energized, the set of originals on the reservation table 2 falls by its own weight due to the inclination of the reservation table 2 and slides on the reservation table 2 to the original feed inlet 3 of the circulation type automatic document feeder C. When the holder solenoid 134 is deenergized, the original holder 132 is restored to its upright position so that the set of originals are not slided on the surface of the reservation table 2 and are kept on the table.

In operation, upon termination of setting the originals on the reservation table or tables, the holder solenoid 134 is actuated, so that the original holder 132 falls to allow the set of originals S to advance to the original feed inlet 3. The originals S advanced to the inlet 3 are fed out one by one from the bottom by the separating mechanism 5 and are transported through the sheet passage 7 onto the platen glass 6. After the original is image-processed (image exposure), it is discharged through the discharge passage 11 and through the discharge outlets 22 to the topmost of the originals on the same reservation table. The flow of three simplex originals S1, S2 and S3 is the same as shown in FIG. 6. By feeding the originals from the bottom S3 and collecting back the same and performing one operation shown in FIG. 6, one set of originals is processed, and by repeating a required number of times, a desired number of prints can be produced.

In the final cycle, the originals S3, S2 and S1 are image-processed on the platen, and thereafter are discharged through the guiding passage 142 onto the original discharge table, thus, the reservation table from which all the originals have been processed, is empty.

FIG. 18 illustrates operation of the reservation tables 2, 2' and 2" when three operators take three simplex originals, respectively. Three operators put their sets of originals on the reservation tables 2, 2' and 2", respectively. The image processing operation is executed in an inputted sequence. The first operator puts the set of originals S1, S2 and S3 on the first reservation table 2; the second operator puts the set of originals S'1, S'2 and S'3 on the second reservation table 2'; and the third operator puts the set of originals S"1, S"2 and S"3 on the third reservation table 2'. Assuming that the mode is selected such that the first, second and third reservation tables are subjected to operation in this order, the first reservation table 2 is first moved to a position corresponding to the original feed inlet 3 (FIG. 18A), and the process similar to the above-described is performed. Upon completion of the final cycle, the first reservation table 2 becomes empty and the set of originals S1, S2 and S3 is discharged onto the original discharge table 141 (FIG. 18B). Subsequently, the second reservation table 2' is brought to the position corresponding to the original feed inlet 3 and takes the position of the first reservation table. The similar operation is performed as for the first reservation table 2 until the second reservation table 2' becomes empty. The set of originals S'1, S'2 and S'3 is discharged to the original discharge table 141, more particularly above the first set of the originals (FIG. 18C). In the similar manner, the set of originals S"1, S"2 and S"3 contained in the third reservation table 2" is subjected to the image processing a predetermined number of times, and thereafter is received by the discharge table 141 above the second set of originals. Thus, the third reservation table 2" becomes empty (FIG. 18D). In this embodiment, the discharge table 141 includes plural accommodating trays. However, a single discharge tray may be usable which is shiftable to provide substantial partition between the sets of originals.

As described, the sets of originals on the reservation tables 2, 2' and 2" is automatically discharged, after the image processing, to the original discharge table 141 which is separately provided from the reservation device B, and the reservation tables are empty after completion of the processing. Thus, the fourth operator is permitted to set a set of originals on any of empty reservation table. Such is also true for fifth and sixth operators. If sets of originals are placed on empty reservation tables, the image processing can be endlessly performed. In addition, it is not necessary to effect reversing rotation of the roller 4 to reverse the sheet.

On a part of the outer casing of the reservation table or the reservation device, there is provided a display to indicate by LED or liquid crystal display whether the sets of originals on the reservation tables have been processed or not, so that the next operator can easily discriminate which reservation table should be selected.

The reservation device B is mounted to a circulation type automatic document feeder C, but it is easily detachable from the document feeder C. And by demounting the reservation device B from the document feeder C and setting a single original stacking table thereto, the system can be operated as a usual circulation type automatic document feeder C. According to this embodiment, the document feeder comprises a plurality of movable original reservation table disposed at the original processing station, driving means for moving the original reservation table so that a selected one of the original reservation table is brought to the sheet original feed/discharge position, original discharge station separate from the original reservation tables for receiving discharged originals, wherein the plural reservation tables stacking sheet originals are sequentially brought to the feed/discharge position, and the sheet originals on the reservation tables are continuously processed. The sheet originals which have been processed are discharged to the discharge station, thus evacuating the original reservation tables to allow the next sheet originals to be put thereon. Accordingly, the waiting time for the operator is minimized, and in addition, the image forming apparatus can be continuously operated without interruption. Thus, the time loss can be saved, and the apparatus can be efficiently used.

In addition, each of the original reservation tables is brought to the sheet original feed/discharge position, the space can be utilized more efficiently than when the reservation tables are provided externally. Therefore, the size and weight of the apparatus can be reduced with the advantage of the reduced conveying path of the sheet originals resulting in less occurrences of jam. Accordingly, the reliability of the apparatus can be enhanced.

Figure 19:
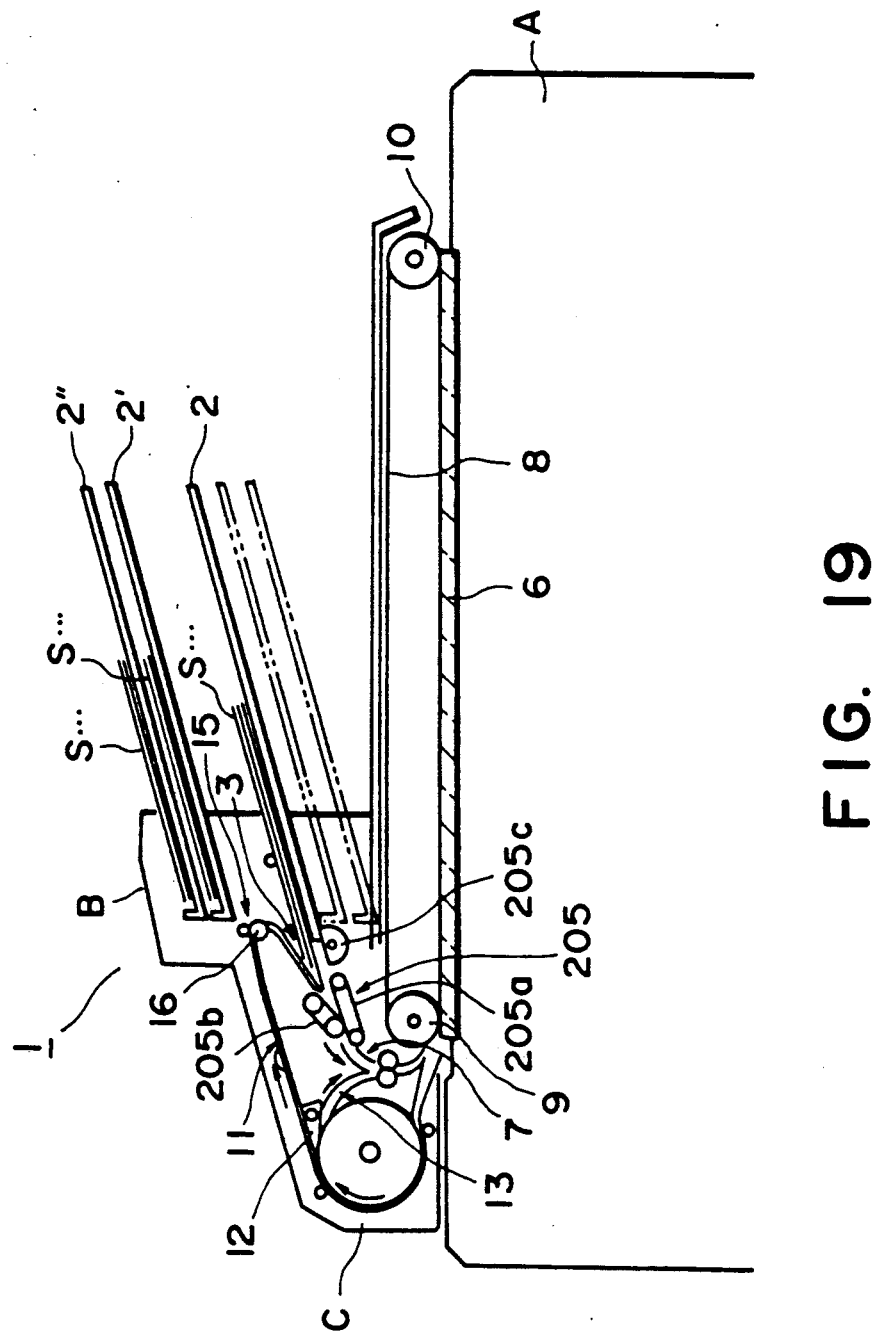
FIG. 19 is a sectional side view of a document feeder according to a further embodiment of the present invention.

Referring to FIG. 19, a yet further embodiment of the present invention will be described. Since this embodiment is similar to the foregoing embodiments, the detailed explanation is omitted for the sake of simplicity by assigning like reference numerals to the elements having corresponding function.

As shown in FIG. 19, an image forming apparatus such as a copying machine A is provided with a reservation device B includes first, second and third original stacking tables 2, 2' and 2" for stacking sets of originals S, respectively. Designated by reference character C is a circulation type automatic document feeder. An original feeding station 205 includes a lower conveyor belt 205a and an upper separation belt 205b and also includes a feeding roller 205c. The feeding roller 205c feeds a set of originals S from an original stacking table 2, 2' or 2" to between the conveying roller 205a and the separation roller 205b, which are cooperative to feed one by one the originals S from the bottom.

Figure 20:
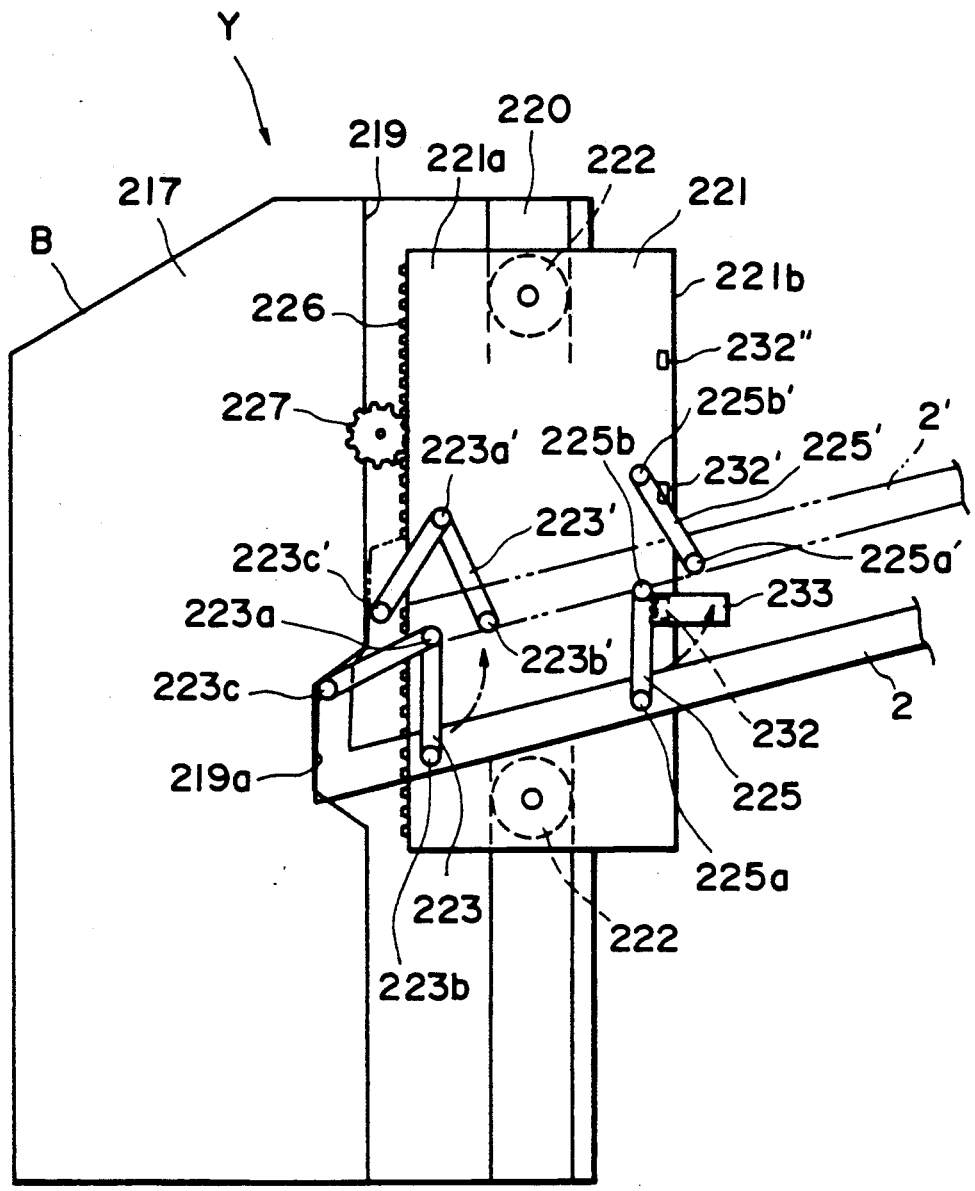
FIG. 20 is an enlarged sectional view illustrating a moving mechanism for a reservation device.
Figure 21:
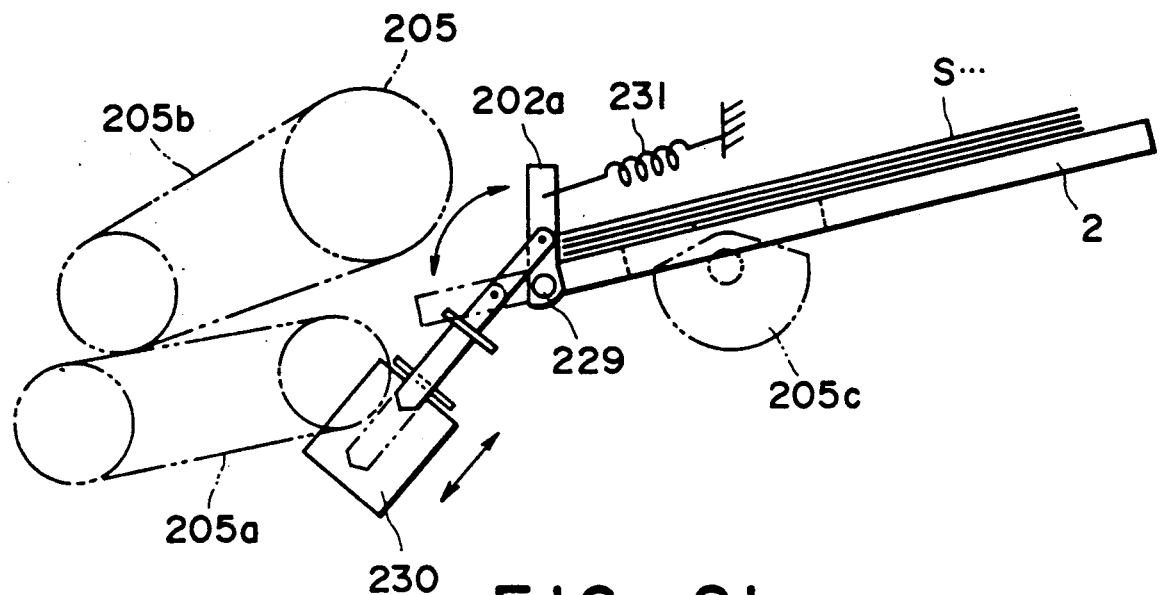
FIG. 21 is a detailed side view of the original stacking table.

As shown in FIG. 20, a unit of the original stacking tables 2, 2' and 2" of the reservation device B is provided with a driving mechanism Y, which is shown in a larger scale in this Figure for the first and second original stacking tables 2 and 2' for example. Front and rear plates 217 constituting a frame of the reservation device B are provided with cam plates 219 and slide rails 220 fixed thereto. The reservation device B has a support plate 221 for supporting the original stacking tables 2, 2' and 2", and the supporting plate 221 is provided with guiding rollers 222 and 222 at its upper and lower portions. The guiding rollers 222 and 222 are engaged to the slide rail 220 to guide the vertical movement of the support plate 221. The support plate 221 is provided with first links 223 and 223' and second links 225 and 225' which constitute a parallel linkage and which support the original stacking tables 2 and 2'. The first links 223 and 223' in the form of a crank are rotatably supported to the support plate 221 at its central portions 223a and 223a'. One side ends 223b and 223b' are rotatably mounted to the original stacking table 2 and 2", and the other side ends 223c and 223c' are slidable in engagement with the cam plate 219. The second links 225 and 225' are rotatably mounted to the original stacking tables 2 and 2' at their one side ends 225a and 225a' and are rotatably mounted to the support plate 221 adjacent the other side ends 225b and 225b'. At one end 221a of the support plate 221, a rack 226 is formed which is meshable with a pinion 227 supported on the plate 217, so that the support plate 221 is vertically movable by the rotation of the pinion 227. The pinion 227 is driven by an elevating motor not shown. The cam plate 219 has a cut-away portion 219a formed thereon. When a selected original stacking table 2 for example comes to a position corresponding to the original feed inlet 3 by the vertical movement of the support plate 221, said other end 223c of the first link 223 of the original stacking table 2 is received by the cut away portion 219a, so that the original stacking table 2 is moved toward the original feeding station 205. This movement may be made by a spring force or by the weight of the stacking table 2. When the other end 223c of the first link is released from the cut away portion 219a, the original stacking table 2 is moved away from the position close to the original feeding station 205 back to its initial position. The original stacking table 2 is brought close to the original feeding station 205, as shown in FIG. 21, and the feeding portion 202a thereof is inserted into between the belts 205a and 205b of the original feeding station 205, as shown by broken lines. The leading portion 202a is rotatable about a shaft 229 and has a plunger 230 and a spring 231 mounted thereto. When the plunger 230 is not energized, the leading portion 202a stands up by the spring 231 to function as a stopper to which the originals are abutted. When the plunger 230 is actuated, the leading portion 202a falls by the action of the plunger 230 to function as a guide for the originals. At the other end 221b of the support plate 221, as shown in FIG. 20, there are formed position detecting holes 232, 232' and 232" corresponding to the original stacking tables 2, 2' and 2", respectively. By means of the position detecting sensor 233, the original stacking table to be brought to the position corresponding to the feed inlet 3 can be randomly selected.

Figure 22A:
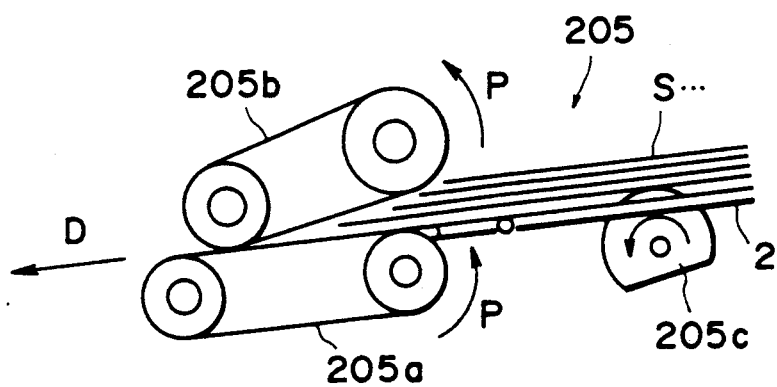
FIG. 22A illustrates operation of the original feeding station wherein the originals are separated and fed.
Figure 22B:
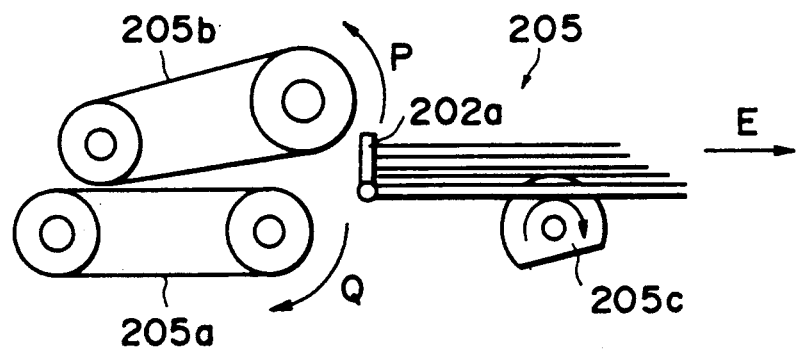
FIG. 22B illustrates operation of the original feeding station where the originals are fed back.

As shown in FIG. 22A, the original feeding station 5 rotates the conveying belt 205a in a direction of an arrow P to feed the bottom most original in the downstream direction D. On the other hand, the separation belt 205b rotates in the direction indicated by the arrow P, so as to apply a force to the original tending to urge the original in the upstream direction, so that the set of originals S stacked on the original stacking table 2 are fed out one by one from the bottom in the downstream direction D. Upon completion of the processing of the originals on the original stacking table 2, the conveying belt 205a as shown in FIG. 22B, is switched to rotate in the opposite direction Q so as to reverse the set of originals S from between the conveying belt 205a and the separation belt 205b toward the original stacking table 2 in the direction indicated by an arrow E. At this time, the feeding roller 205c rotates in the opposite direction to provides an aid for returning the originals.

Now the description will be made with respect to a switching mechanism S for switching rotation of the conveying belt 205a.

Figure 23:
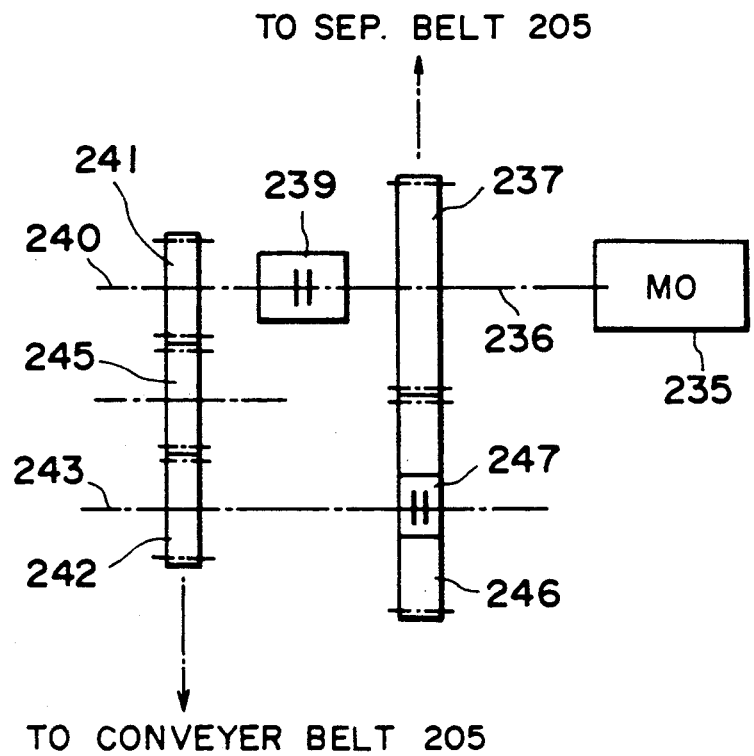
FIG. 23 shows a gear train arrangement for switching a driving direction of a conveyor belt.

Referring to FIG. 23, wherein gear train of the switching mechanism X for reversing rotation of the conveying belt 205a is shown. A driving shaft 236 directly connected to a separating motor 235 for driving the conveying belt 205a and the separation belt 205b of the original feeding station 205 has a separating gear 237 fixed thereto. The driving force outputted from the separating gear 237 to the separating belt 205b. To the driving shaft 236, a transmission shaft 240 is connected through a separating clutch 239. To the transmission shaft 240 a transmission gear 241 is fixedly mounted. On the other hand, a conveying gear 242 for outputting driving force to the conveying belt 205a is fixedly mounted to a conveying shaft 243, and the conveying gear 242 is operatively coupled with the transmission gear 241 through an idle gear 245. Further, a reverse conveying gear 246 is connected to the conveying shaft through a conveying clutch 247. The reverse gear 246 is meshable with the separating gear 237.

Figures 24A, 24B:
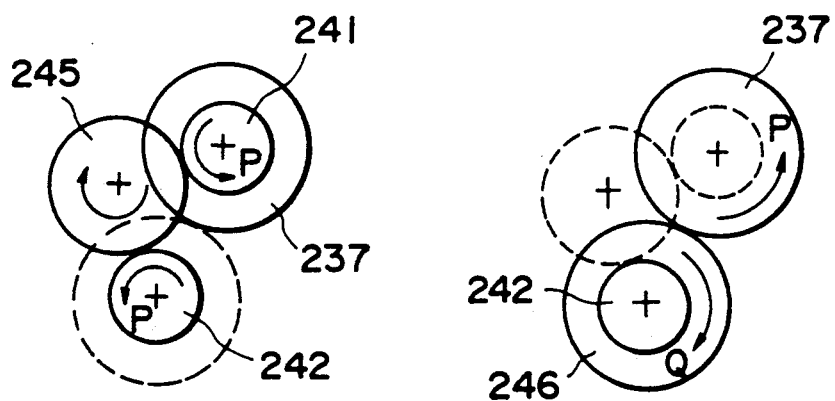
FIGS. 24A and 24B illustrate rotations of each of the gears of FIG. 23, wherein in FIG. 24A, the originals are separated and fed; and in FIG. 24B, the originals are fed back.

FIGS. 24A and 24B illustrate rotations of major gears for switching the rotation of the conveying belt 205a, wherein the gears in the driving rotation are shown by solid lines, while gears not rotating or rotating idly are shown by broken lines.

When the originals on the original stacking table 2 is separated and fed out, the separating clutch 239 is engaged, while the conveying clutch 247 is disengaged. Thus, the separating motor 235 rotates the separating gear 237 in the same direction as that of the motor 235 and rotates the transmission gear 241 in the direction of the arrow P, the same as the direction of the separating motor 235 rotation, and rotates the conveying gear 242 in the direction of an arrow P through the idle gear 245, as shown in FIG. 24A. When, on the other hand, the originals S are driven toward the original stacking table 2, the separating clutch 239 is disengaged, while the conveying clutch 247 is engaged. By this, the separating motor 235 rotates the separating gear 237 in the direction of the arrow P, that is, the same direction as that of the motor 235 similarly to the above-described case, and rotates the reverse gear 246 meshed with the separating gear 237 in the direction of an arrow Q, and further rotates the conveying gear fixedly mounted to the conveying shaft 243 rotatable integrally with the reverse gear 246 through the conveying clutch 247 in a direction Q, the same direction as that of the rotational direction of the reverse gear 246.

In operation, a selected original stacking table, for example, the first original stacking table 2 among the first, second and third original stacking tables 2, 2' and 2" stacking originals thereon, is brought to a position corresponding to the original feed inlet 3, at which time the original stacking table 2 is moved close to the original feeding station 205. The leading portion 202a falls to provide a guide to the original. The originals on the original stacking table 2 are fed into the original feeding station 5 by the feeding roller 205c (FIG. 22A). Then, the bottommost original S is separated out by the cooperation of the conveying belt 205a rotating in the direction P and the separating belt 205b rotating in the direction P, and the separated original S is advanced through the passage 207 and is placed on the platen 6 of the image forming apparatus A. The original S is image-processed, for example read on the platen 6 and is discharged through the discharge passage 11 from the platen 6. The original S is returned to the same original stacking table 2 through the original discharge outlet by the discharging rollers 16 and is again stacked on the original stacking table. The original which is next from the bottom is circulated in the similar manner from the original stacking table 2 through the platen 6 and back to the original stacking table 2. In this manner, the originals S on the original stacking table 2 are circulated a predetermined number of times. Upon completion of the predetermined number of circulations, as shown in FIG. 22B, the feeding belt 205a of the original separating station 205 rotates in the opposite direction, that is, the direction Q. The originals fed by the feeding roller 205c into between the conveying belt 205a and the separating belt 205b and remaining in the original feeding station 205 are pushed back toward the original stacking table 2 in the direction E, so as to accommodate all of the originals S remaining in the original feeding station 205 to the original stacking table 2.

Then, the leading portion 202a of the original stacking table 2 is actuated to take a standup position so as to prevent the set of originals S from moving into between the conveying belt 205a and the separating belt 205b. Subsequently, the original stacking table 2 is moved away from the original feeding station 205, and the next predetermined original stacking table is brought to a position corresponding to the original feed inlet 3 and is further shifted to a position close to the original feeding station 205. The original S are circulated between the platen 6 a predetermined number of times. In this manner, the set of originals stacked on the original stacking tables 2, 2' and 2" are continuously processed.

According to this embodiment, the document feeder comprises a plurality of original stacking tables which are movable, driving means for moving a selected one of the original stacking tables to a position corresponding to the original feeding station and switching means for switching the drive of the original feeding station, wherein upon completion of a predetermined number of circulations of the sheet originals, the drive of the original feeding station is switched to such a direction that the sheet originals remaining in the original feeding station is reversely conveyed to the same original stacking table. The automatic document feeder has plural original stacking tables and is capable of sorting a required number of originals without provision of a special sorting equipment. In addition, the document feeder can receive reserved sets of originals on the plural original stacking tables, thus saving time loss arising from the necessity of the operator to wait for his turn. The operation rate of the apparatus is increased.

Figure 27:
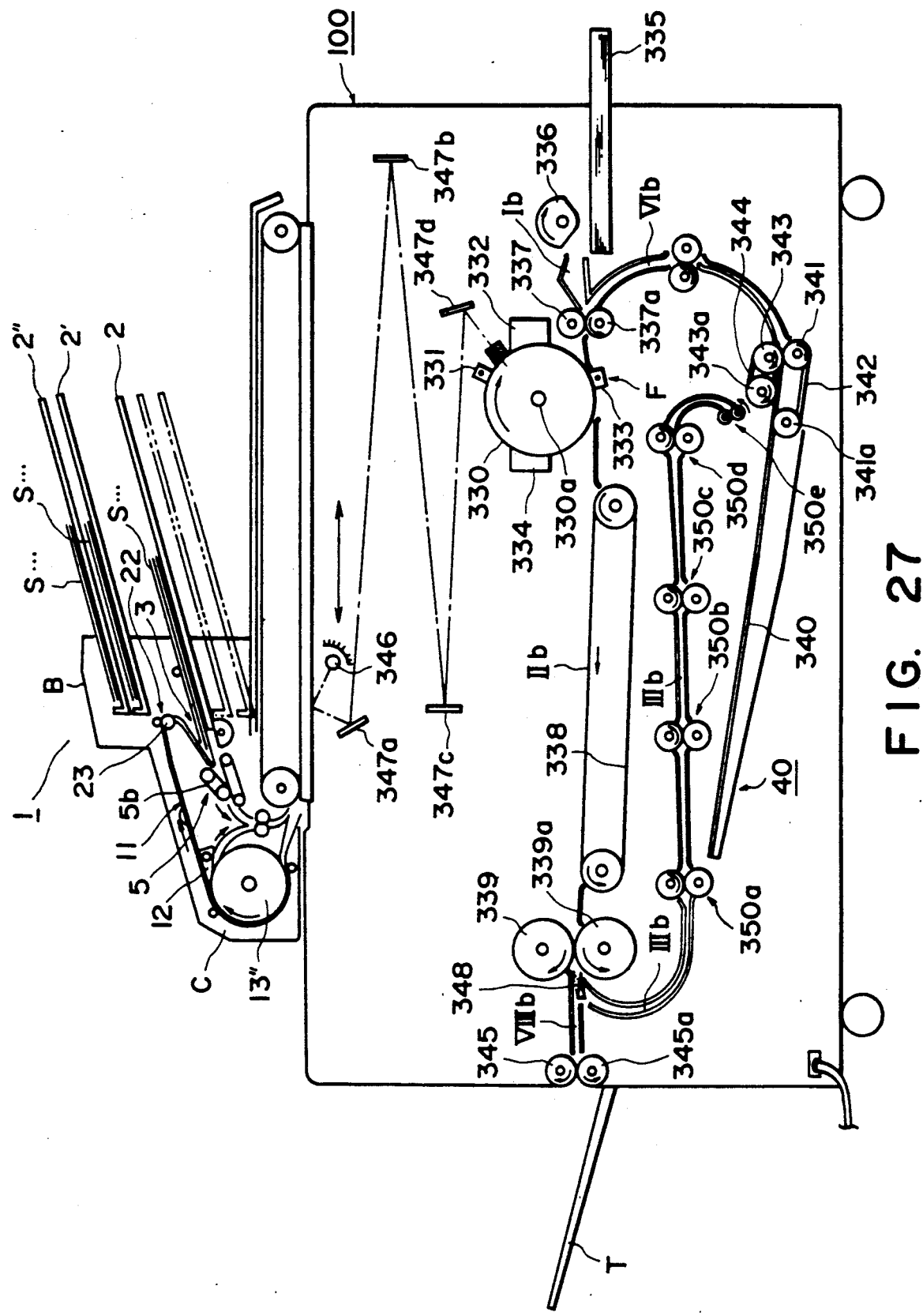
FIG. 27 is a sectional view of an image forming apparatus usable with the present invention.
Figure 25:
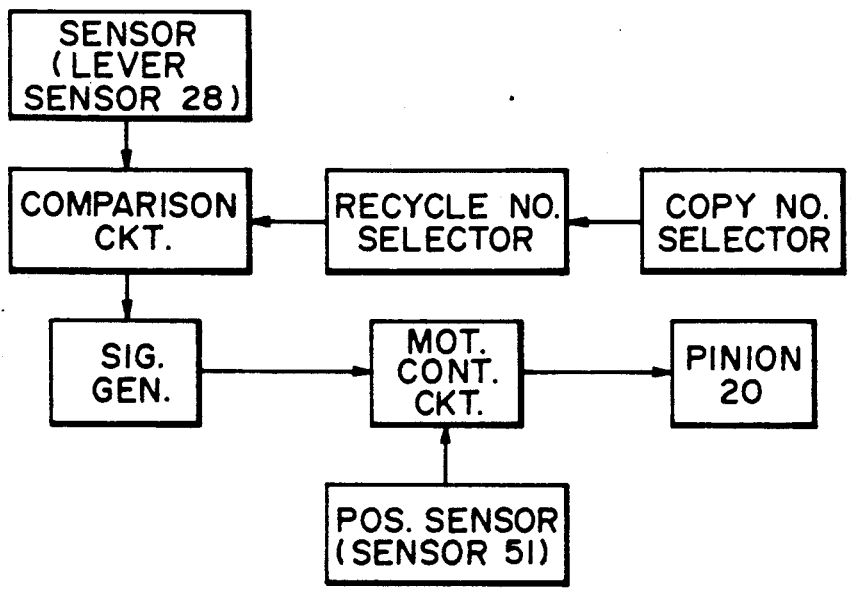
FIG. 25 is a block diagram illustrating control in FIG. 1 embodiment.
Figure 26:
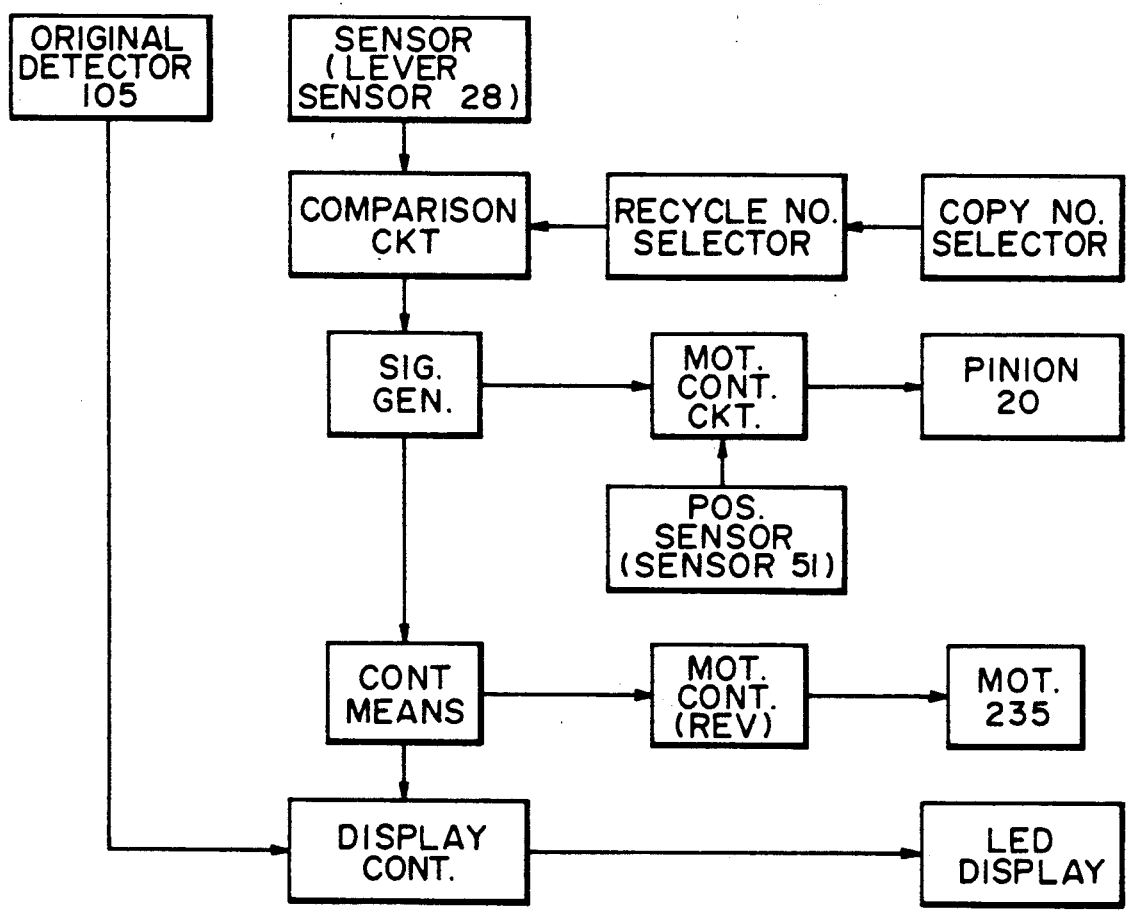
FIG. 26 is a block diagram illustrating a control in FIG. 10 embodiment.

Referring to FIG. 27, the arrangements of the mechanism for the copy sheets are illustrated. The detail thereof is disclosed in U.S. Ser. No. 750,029.

The duplex copying apparatus comprises a platen glass (unnumbered); a photosensitive drum 330 rotatable about a shaft 330a in the direction shown by an arrow, a charger 331, a developing device 332, a transfer charger 333, a cleaning device 334, a cassette 335 for storing the copy materials such as copy sheets, a feeding roller 336 for feeding one by one copy sheets in the cassette 335, register rollers 337 and 337a, and a conveyor belt 338 for conveying the copy sheet to a fixing device having rollers 339 and 339a after the image is transferred onto the copy sheet. The apparatus further comprises an interim tray 340 for tentatively depositing a simplex copy, a driving shaft 341 and a driven shaft 341a of a feeding belt 342, a driving shaft 343 and a driven shaft 343a of a separating belt 344 to re-feed the simplex copy sheets deposited on the interium tray 340 from the bottom. The apparatus further includes discharging rollers 345 and 345a for discharging the copy sheets after completion of the copying operation to a tray T, or to proper bins of sorter not shown, if the sorter is equipped.

The movement of a copy sheet will be described. First, the description will be made as to the case where simplex copies are produced. A copy sheet is fed out of the cassette 335 by a feeding or pick-up roller 336 and then fed to a transfer station F so as to be aligned with the formed and visualized image on the photosensitive drum 330 by the register rollers 337 and 337a. In the transfer station, the image on the photosensitive drum 330 is transferred onto the copy sheet. The copy sheet having received the visualized image is conveyed along the sheet passageway IIb on the conveyor belt 338 to the fixing device having the rollers 339 and 339a where the visualized image is fixed on the copy sheet. Thereafter, the copy sheet is discharged to the tray T by the discharging rollers 345 and 345a along the passageway VIIIb.

In the case of duplex copy, a guide 348 provided downstream of the fixing device is shifted to the state shown by broken lines so that the copy sheet having an image only on one side is introduced to a passageway IIIb after having passed through the fixing device. The copy sheet is inverted by passing along the passageway IIIb and then stored on an interim tray 340. Next, the copy sheet on the interim tray 340 is separated by the rotation of the belts 342 and 344 and fed out one by one from the tray 340 to a passageway VIb. The copy sheet fed to the passageway VIb is conveyed to the transfer station F into alignment with the image on the photosensitive drum 330 by the same register rollers 337 and 337a. In the transfer station, the visualized image on the photosensitive drum 330 is transferred onto the second side of the copy sheet. The copy sheet then passes along the passageway IIb, and the image on the second side is fixed so that the copies are formed on the both sides of the copy sheet, and the copy sheet is discharged to the tray T. Along the passageway IIIb, there are provided 20 couples of rollers 350a, 350b, 350c and 350d to properly convey the copy sheet and a couple of rollers 350e for discharging the copy sheet to the interim tray 340.

While the invention has been described with reference to the structures disclosed herein, it is not confined to the details set forth and this application is intended to cover such modifications or changes as may come within the purposes of the improvements or the scope of the following claims.

What is claimed is:

1. An automatic document feeder, comprising:
   original stacking means having a plurality of stacked trays which are spaced from one another, each tray being capable of accommodating sheet originals;
   means for supporting said plural trays for movement substantially along the stacking;
   feeding means for feeding sheet originals from a selected one of said trays;
   conveying means for conveying the sheet originals from said feeding means to a predetermined position;
   means for returning the sheet originals from the predetermined position to said selected tray; and
   driving means for driving said plural trays so as to bring said trays selectively toward said feeding means.

2. A feeder according to claim 1, wherein said returning means is provided with a sheet passage for returning the sheet originals from a feeding side of said original stacking means.

3. A feeder according to claim 1, wherein said returning means is provided with a sheet passage for returning the sheet originals from a non-feeding side of said original stacking means.

4. A feeder according to claim 1, further comprising detecting means for detecting that the sheet originals are fed out to the predetermined position from said selected tray a preset number of times, and control means for controlling said driving means in response to an output of said detecting means.

5. A feeder according to claim 1, wherein said trays are supported as a unit on said supporting means.

6. A feeder according to claim 1, further comprising means for enlarging space between a selected tray and an adjacent stage, wherein the space is larger than space between the other adjacent trays.

7. A feeder according to claim 6, wherein said space enlarging means includes a linkage mechanism for moving said trays in a direction inclined from a vertical direction and cam means for displacing one of said linkage mechanism.

8. A feeder according to claim 1, wherein said trays are inclined downwardly toward said feeding means.

9. A feeder according to claim 8, further comprising stopper means which is movable between a first position, in which said stopper means stops edges of the sheet originals and a second position, in which said stopper means allows sliding movement of the sheet originals, and wherein said stopper means assumes the first position when said driving means moves said plural trays.

10. A feeder according to claim 1, wherein said selected tray is projected toward said feeding means.

11. A feeder according to claim 10, wherein said feeding means is opposed to said projected tray.

12. A feeder according to claim 9, wherein said feeding means includes a rotatable member which is reversely rotatable to return the sheet originals prior to said plural tray being driven by said driving means.

13. A feeder according to claim 12, further comprising stopper means movable to a position for stopping edges of said sheet originals returned by the rotatable member.

14. A feeder according to claim 1, further comprising means for detecting presence or absence of the sheet originals and means for displaying such detection.

15. A feeder according to claim 1, further comprising means for displaying completion of processing the sheet originals for each of said trays.

16. A feeder according to claim 15, wherein said display means comprises lighting means provided in each of said trays.

17. A feeder according to claim 1, further comprising accommodating means separate from said original stacking means for accommodating sheet originals which have been processed.

18. A feeder according to claim 1, wherein each of said trays comprises lever means for detecting completion of circulation of the originals.

19. A feeder according to claim 1, further comprising detecting means for detecting passage of a card to detect completion of circulation of sheet originals.

20. An automatic document feeder, comprising:
    original stacking means having a plurality of stacked trays which are spaced from one another, each tray being capable of accommodating sheet originals;
    means for supporting said plural trays for movement substantially along the stacking direction;
    feeding means, disposed at an original inlet, for feeding sheet originals from a selected one of said trays;
    conveying means for conveying the sheet originals from said feeding means to an original reading position below said original stacking means;
    means for returning the sheet originals from the reading position to said selected tray through an original outlet above said original inlet; and
    driving means for driving said plural trays so as to being said trays selectively toward said feeding means.

21. A feeder according to claim 20, wherein a bottom of a stage just above said selected tray is above the discharge outlet.

22. An image forming apparatus, comprising:
    original stacking means having a plurality of stacked trays which are spaced from one another, each tray being capable of accommodating sheet originals;

means for supporting said plural trays for movement substantially along the stacking direction;

feeding means for feeding sheet originals from a selected one of said trays; conveying means for conveying the sheet originals from said feeding means to an original reading position;

means for returning the sheet originals from the reading position to said selected tray;

driving means for driving said plural trays so as to bring said trays selectively toward said feeding means; and control means for feeding the originals to the original reading position a preset number of times.

23. A document feeder, comprising:

original stacking means for stacking sheet originals on a tray;

feeding means for feeding the sheet originals one by one from said stacking means;

conveying means for conveying the sheet originals fed by said feeding means to a predetermined position;

returning means for returning the sheet originals from the predetermined position to said original stacking means;

wherein said feeding means includes a reversible rotatable member for feeding the sheet originals by forward rotation during an original feeding operation, and for moving, by backward rotation, a sheet original that has been returned to said original stacking means by said returning means back toward an upstream side of said feeding means with respect to movement direction of the originals in response to termination of the feeding operation.

24. An automatic document feeder, comprising:

original stacking means having plural stages spaced from each other, each of which is capable of accommodating sheet originals;

means for supporting said plural stages for movement substantially along the stages;

feeding means for feeding sheet originals from a selected one of said stages of said original stacking means;

conveying means for conveying the sheet originals from said feeding means to a predetermined position;

means for returning the sheet originals having been placed at the predetermined position to the same selected stage;

driving means for driving said original stacking means so as to bring said plural stages selectively toward said feeding means;

said stages being inclined downwardly toward said feeding means; and said feeding means including a rotatable member which is reversely rotatable to return the sheet originals prior to the original stacking means being driven by said driving means.

25. An automatic document feeder, comprising:

original stacking means having plural stages spaced from each other, each of which is capable of accommodating sheet originals;

means for supporting said plural stages for movement substantially along said stages;

feeding means for feeding sheet originals from a selected one of said stages of said original stacking means;

conveying means for conveying the sheet originals from said feeding means to a predetermined position;

means for returning the sheet originals having been placed at the predetermined position to said same selected stage;

driving means for driving said original stacking means so as to bring said plural stages selectively toward said feeding means;

detecting means for detecting that the sheet originals are fed out to the predetermined position from said selected stage a preset number of times; and control means for controlling said driving means in response to an output of said detecting means.

26. An automatic document feeder, comprising:

original stacking means having plural stages spaced from each other, each of which is capable of accommodating sheet originals;

means for supporting said plural stages for movement substantially along said stages;

feeding means for feeding sheet originals from a selected one of said stages of said original stacking means;

conveying means for conveying the sheet originals from said feeding means to a predetermined position;

means for returning the sheet originals having been placed at the predetermined position to said same selected stages;

driving means for driving said original stacking means so as to bring said plural stages selectively toward said feeding means;

means for enlarging space between a selected stage and an adjacent stage, wherein the space is larger than space between other adjacent stages, wherein said stages are supported as a unit on said supporting means.

27. A feeder according to claim 26, wherein said space enlarging means includes a linkage mechanisms for moving said stages in a direction inclined from a vertical direction and means for displacing one of said linkage mechanisms.

28. An automatic document feeder, comprising:

original stacking means having plural stages spaced from each other, each of which is capable of accommodating sheet originals;

means for supporting said plural stages for movement substantially along said stages;

feeding means for feeding sheet originals from a selected one of said stages of said original stacking means;

conveying means for conveying the sheet originals from said feeding means to a predetermined position;

means for returning the sheet originals having been placed at the predetermined position to said same selected stage;

driving means for driving said original stacking means so as to bring said plural stages selectively toward said feeding means; and stopper means which is movable between a first position, in which said stopper means stops edges of the sheet originals and a second position, in which said stopper means allows sliding movement of the sheet originals, wherein said stopper means assumes the first position when said driving means moves said original stacking means, and wherein said stages are inclined downwardly toward said feeding means.

29. An automatic document feeder, comprising:

original stacking means having plural stages spaced from each other, each of which is capable of accommodating sheet originals;

means for supporting said plural stages for movement substantially along said stages;

feeding means for feeding sheet originals from a selected one of said stages of said original stacking means;

conveying means for conveying the sheet originals from said feeding means to a predetermined position;

means for returning the sheet originals having been placed at the predetermined position to said same selected stage; and driving means for driving said original stacking means so as to bring said plural stages selectively toward said feeding means, wherein said selected stage is projected toward said feeding means.

30. A feeder according to claim 29, wherein said feeding means is opposed to said projected stage.

31. A feeder according to claim 28, wherein said feeding means includes a rotatable member which is reversely rotatable to return the sheet originals prior to said original stacking means being driven by said driving means.

32. A feeder according to claim 31, further comprising stopper means movable to a position for stopping edges of the sheet originals returned by said rotatable member.

33. An automatic document feeder, comprising:

original stacking means having a plurality of stacked trays which are spaced from one another, each tray being capable of accommodating sheet originals;

feeding means for feeding sheet originals from a selected one of said trays;

conveying means for conveying the sheet originals from said feeding means to a predetermined position;

means for returning the sheet originals from the predetermined position to said selected tray; and driving means for imparting relative movement between said plural trays and said feeding means so as to bring said trays selectively toward said feeding means.

34. An image forming apparatus, comprising:

original stacking means having a plurality of stacked trays which are spaced from one another, each tray being capable of accommodating sheet originals;

feeding means for feeding sheet originals from a selected one of said trays;

conveying means for conveying the sheet originals from said feeding means to an original reading positions;

means for returning the sheet originals from the reading position to said selected tray; and driving means for imparting relative movement between said plural trays and said feeding means so as to bring said trays selectively toward said feeding means.

* * * * *

UNITED STATES PATENT AND TRADEMARK OFFICE
CERTIFICATE OF CORRECTION

PATENT NO. : 5,052,669

DATED : October 1, 1991

INVENTOR(S) : NORIYOSHI UEDA, ET AL.

It is certified that error appears in the above-identified patent and that said Letters Patent is hereby corrected as shown below:

On title page,

IN [56] REFERENCES CITED

Under OTHER PUBLICATIONS, "Techincal" should read --Technical--.

COLUMN 1

Line 31, "been" should read --been made--.
Line 49, "and" should be deleted.
Line 65, "it is" should read --they are--.

COLUMN 2

Line 44, "table" should read --tables--.
Line 45, "table" should read --tables--.

COLUMN 3

Line 11, "is" should read --are--.
Line 24, "is" should read --are--.

COLUMN 4

Line 55, "table" should read --tables--.
Line 63, "table" should read --tables--.
Line 68, "is" should read --are--.

COLUMN 5

Line 1, "is" should read --are--.
Line 12, "remaining" should read --they remain--.
Line 13, "ing" should read --ing on--.
Line 54, "are" should read --is--.

UNITED STATES PATENT AND TRADEMARK OFFICE
CERTIFICATE OF CORRECTION

PATENT NO. : 5,052,669

DATED : October 1, 1991

INVENTOR(S) : NORIYOSHI UEDA, ET AL.

It is certified that error appears in the above-identified patent and that said Letters Patent is hereby corrected as shown below:

COLUMN 7

Line 7, "constitute" should read --constitutes--.
Line 17, "platen 6," should read --platen 6--.
Line 41, "changes," should read --change,--.
Line 47, "inlet" should read --inlet 3--.
Line 49, "it" should read --they--.
Line 53, "roller" should read --rollers--.
Line 58, "hole" should read --holes--.

COLUMN 8

Line 34, "becomes" should read --comes--.
Line 42, "are" should read --is--.
Line 43, "sliden" should read --slid--.
Line 48, "are" should read --is--.

COLUMN 9

Line 3, "slides" should read --to slide--.
Line 36, "prosecuted" should read --executed--.

COLUMN 10

Line 58, "table 62'." should read --table 63'.--.

COLUMN 11

Line 30, "loosing" should read --losing--.
Line 62, "displays with" should read --displays 160, 160' and 160" are each provided inside thereof with--.
Line 66, "FIG." should read --FIGS.--.

UNITED STATES PATENT AND TRADEMARK OFFICE
CERTIFICATE OF CORRECTION

PATENT NO. : 5,052,669
DATED : October 1, 1991
INVENTOR(S) : NORIYOSHI UEDA, ET AL.

It is certified that error appears in the above-identified patent and that said Letters Patent is hereby corrected as shown below:

COLUMN 12

Line 9, "tuate" should read --tuates-- and
"The display" should read --The displays--.

COLUMN 13

Line 22, "solenoid 34" should read --solenoid 134--.
Line 32, "sliden" should read --slid--.
Line 67, "table 2'." should read --table 2".--.

COLUMN 14

Line 28, "is" should read --are--.
Line 33, "of" should be deleted.
Line 53, "table" should read --tables--.
Line 55, "table" should read --tables--.
Line 56, "table" should read --tables--.

COLUMN 15

Line 3, "each" should read --when each--.
Line 20, "includes" should read --which includes--.
Line 28, "roller 205a" should read --belt 205a--.
Line 29, "roller 205b" should read --belt 205b--.
Line 39, "table 2, 2'" should read --tables 2 and 2'--.
Line 40, "and 2"," should be deleted.
Line 43, "rail 220" should read --rails 220--.
Line 51, "table 2 and 2"," should read --tables 2 and 2'--.
Line 53, "plate 219." should read --plates 219.--.
Line 62, "The" should read --Each--.

UNITED STATES PATENT AND TRADEMARK OFFICE
CERTIFICATE OF CORRECTION

PATENT NO. : 5,052,669

DATED : October 1, 1991

INVENTOR(S) : NORIYOSHI UEDA, ET AL.

It is certified that error appears in the above-identified patent and that said Letters Patent is hereby corrected as shown below:

COLUMN 16

Line 10, "feeding" should read --leading-- and "into" should be deleted.
Line 27, "station 5" should read --station 205--.
Line 54, "force" should read --force is--.

COLUMN 17

Line 4, "is" should read --are--.
Line 36, "station 5" should read --station 205--.
Line 58, "into" should be deleted.
Line 66, "into" should be deleted.

COLUMN 18

Line 5, "original S" should read --originals S--.
Line 19, "is" should read --are--.
Line 22, "a" should be deleted.
Line 32, "(unnumbered);" should read --(unnumbered),--.

COLUMN 19

Line 8, "sheet" should read --sheets-- and "is" should read --are--.
Line 65, "stage," should read --tray,--.

COLUMN 20

Line 21, "tray" should read --trays--.
Line 60, "being" should read --bring--.

UNITED STATES PATENT AND TRADEMARK OFFICE
CERTIFICATE OF CORRECTION

PATENT NO. : 5,052,669

DATED : October 1, 1991

INVENTOR(S) : NORIYOSHI UEDA, ET AL.

It is certified that error appears in the above-identified patent and that said Letters Patent is hereby corrected as shown below:

COLUMN 21

Line 4, "conveying" should read --¶ conveying--.
    Line 21, "tion;" should read --tion; and--.
    Line 50, "stage;" should read --stage; and--.

COLUMN 22

Line 30, "stages;" should read --stage;--.
    Line 33, "means;" should read --means; and--.
    Line 40, "a" should be deleted.

COLUMN 24

Line 26, "positions;" should read --position;--.

Signed and Sealed this

Sixth Day of September, 1994

Attest:

BRUCE LEHMAN

Attesting Officer

Commissioner of Patents and Trademarks